(12) United States Patent
Cohen et al.

(10) Patent No.: US 11,962,901 B2
(45) Date of Patent: *Apr. 16, 2024

(54) SYSTEMS AND METHODS FOR OBTAINING A SUPER MACRO IMAGE

(71) Applicant: Corephotonics Ltd., Tel Aviv (IL)

(72) Inventors: Noy Cohen, Tel Aviv (IL); Gal Shabtay, Tel Aviv (IL); Ephraim Goldenberg, Tel Aviv (IL); Nadav Geva, Tel Aviv (IL); Udi Yakir, Tel Aviv (IL); Sagi Habani, Tel Aviv (IL); Dolev Danino, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/346,243

(22) Filed: Jul. 2, 2023

(65) Prior Publication Data

US 2023/0353871 A1     Nov. 2, 2023

Related U.S. Application Data

(63) Continuation of application No. 17/600,341, filed as application No. PCT/IB2021/054186 on May 15, 2021, now Pat. No. 11,770,609.

(Continued)

(51) Int. Cl.
*H04N 23/67* (2023.01)
*G02B 3/14* (2006.01)
(Continued)

(52) U.S. Cl.
CPC .............. *H04N 23/67* (2023.01); *G02B 3/14* (2013.01); *G03B 13/36* (2013.01); *G06T 7/50* (2017.01); *H04N 23/69* (2023.01); *H04N 23/698* (2023.01)

(58) Field of Classification Search
CPC ...... H04N 23/67; H04N 23/69; H04N 23/698; G02B 3/14; G02B 15/15; G03B 13/36;
(Continued)

(56) References Cited

U.S. PATENT DOCUMENTS 2,106,752 A    2/1938 Land
2,354,503 A    7/1944 Arthur
(Continued)

FOREIGN PATENT DOCUMENTS

CN    101276415 A    10/2008
CN    101634738 A     1/2010
(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Shahbaz Nazrul
(74) *Attorney, Agent, or Firm* — Nathan & Associates; Menachem Nathan

(57) ABSTRACT

Systems comprising a Wide/Ultra-Wide camera, a folded Tele camera comprising an optical path folding element and a Tele lens module, a lens actuator for moving the Tele lens module for focusing to object-lens distances between 3.0 cm and 35 cm with an object-to-image magnification between 1:5 and 25:1, and an application processor (AP), wherein the AP is configured to analyze image data from the UW camera to define a Tele capture strategy for a sequence of Macro images with a focus plane slightly shifted from one captured Macro image to another and to generate a new Macro image from this sequence, and wherein the focus plane and a depth of field of the new Macro image can be controlled continuously.

20 Claims, 26 Drawing Sheets

Related U.S. Application Data

(60) Provisional application No. 63/177,427, filed on Apr. 21, 2021, provisional application No. 63/173,446, filed on Apr. 11, 2021, provisional application No. 63/164,187, filed on Mar. 22, 2021, provisional application No. 63/119,853, filed on Dec. 1, 2020, provisional application No. 63/110,057, filed on Nov. 5, 2020, provisional application No. 63/070,501, filed on Aug. 26, 2020, provisional application No. 63/032,576, filed on May 30, 2020.

(51) Int. Cl.
*G03B 13/36* (2021.01)
*G06T 7/50* (2017.01)
*H04N 23/69* (2023.01)
*H04N 23/698* (2023.01)

(58) Field of Classification Search
CPC ........ G03B 30/00; G03B 37/02; G03B 17/12; G06T 7/50
See application file for complete search history.

(56) References Cited

U.S. PATENT DOCUMENTS

| | | |
|---|---|---|
| 2,378,170 A | 6/1945 | Aklin |
| 2,441,093 A | 5/1948 | Aklin |
| 3,085,354 A | 4/1963 | Rasmussen et al. |
| 3,388,956 A | 6/1968 | Eggert et al. |
| 3,524,700 A | 8/1970 | Eggert et al. |
| 3,558,218 A | 1/1971 | Grey |
| 3,584,513 A | 6/1971 | Gates |
| 3,864,027 A | 2/1975 | Harada |
| 3,941,001 A | 3/1976 | LaSarge |
| 3,942,876 A | 3/1976 | Betensky |
| 4,134,645 A | 1/1979 | Sugiyama et al. |
| 4,199,785 A | 4/1980 | McCullough et al. |
| 4,338,001 A | 7/1982 | Matsui |
| 4,465,345 A | 8/1984 | Yazawa |
| 4,792,822 A | 12/1988 | Akiyama et al. |
| 5,000,551 A | 3/1991 | Shibayama |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,327,291 A | 7/1994 | Baker et al. |
| 5,331,465 A | 7/1994 | Miyano |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,502,537 A | 3/1996 | Utagawa |
| 5,657,402 A | 8/1997 | Bender et al. |
| 5,682,198 A | 10/1997 | Katayama et al. |
| 5,768,443 A | 6/1998 | Michael et al. |
| 5,892,855 A | 4/1999 | Kakinami et al. |
| 5,926,190 A | 7/1999 | Turkowski et al. |
| 5,940,641 A | 8/1999 | McIntyre et al. |
| 5,969,869 A | 10/1999 | Hirai et al. |
| 5,982,951 A | 11/1999 | Katayama et al. |
| 6,014,266 A | 1/2000 | Obama et al. |
| 6,035,136 A | 3/2000 | Hayashi et al. |
| 6,101,334 A | 8/2000 | Fantone |
| 6,128,416 A | 10/2000 | Oura |
| 6,147,702 A | 11/2000 | Smith |
| 6,148,120 A | 11/2000 | Sussman |
| 6,169,636 B1 | 1/2001 | Kreitzer |
| 6,201,533 B1 | 3/2001 | Rosenberg et al. |
| 6,208,765 B1 | 3/2001 | Bergen |
| 6,211,668 B1 | 4/2001 | Duesler et al. |
| 6,215,299 B1 | 4/2001 | Reynolds et al. |
| 6,222,359 B1 | 4/2001 | Duesler et al. |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,654,180 B2 | 11/2003 | Ori |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,187,504 B2 | 3/2007 | Horiuchi |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,515,351 B2 | 4/2009 | Chen et al. |
| 7,533,819 B2 | 5/2009 | Barkan et al. |
| 7,564,635 B1 | 7/2009 | Tang |
| 7,619,683 B2 | 11/2009 | Davis |
| 7,643,225 B1 | 1/2010 | Tsai |
| 7,660,049 B2 | 2/2010 | Tang |
| 7,684,128 B2 | 3/2010 | Tang |
| 7,688,523 B2 | 3/2010 | Sano |
| 7,692,877 B2 | 4/2010 | Tang et al. |
| 7,697,220 B2 | 4/2010 | Iyama |
| 7,738,016 B2 | 6/2010 | Toyofuku |
| 7,738,186 B2 | 6/2010 | Chen et al. |
| 7,773,121 B1 | 8/2010 | Huntsberger et al. |
| 7,777,972 B1 | 8/2010 | Chen et al. |
| 7,809,256 B2 | 10/2010 | Kuroda et al. |
| 7,813,057 B2 | 10/2010 | Lin |
| 7,821,724 B2 | 10/2010 | Tang et al. |
| 7,826,149 B2 | 11/2010 | Tang et al. |
| 7,826,151 B2 | 11/2010 | Tsai |
| 7,869,142 B2 | 1/2011 | Chen et al. |
| 7,880,776 B2 | 2/2011 | LeGall et al. |
| 7,898,747 B2 | 3/2011 | Tang |
| 7,916,401 B2 | 3/2011 | Chen et al. |
| 7,918,398 B2 | 4/2011 | Li et al. |
| 7,957,075 B2 | 6/2011 | Tang |
| 7,957,076 B2 | 6/2011 | Tang |
| 7,957,079 B2 | 6/2011 | Tang |
| 7,961,406 B2 | 6/2011 | Tang et al. |
| 7,964,835 B2 | 6/2011 | Olsen et al. |
| 7,978,239 B2 | 7/2011 | Deever et al. |
| 8,000,031 B1 | 8/2011 | Tsai |
| 8,004,777 B2 | 8/2011 | Sano et al. |
| 8,077,400 B2 | 12/2011 | Tang |
| 8,115,825 B2 | 2/2012 | Culbert et al. |
| 8,149,327 B2 | 4/2012 | Lin et al. |
| 8,149,523 B2 | 4/2012 | Ozaki |
| 8,154,610 B2 | 4/2012 | Jo et al. |
| 8,218,253 B2 | 7/2012 | Tang |
| 8,228,622 B2 | 7/2012 | Tang |
| 8,233,224 B2 | 7/2012 | Chen |
| 8,238,695 B1 | 8/2012 | Davey et al. |
| 8,253,843 B2 | 8/2012 | Lin |
| 8,274,552 B2 | 9/2012 | Dahi et al. |
| 8,279,537 B2 | 10/2012 | Sato |
| 8,363,337 B2 | 1/2013 | Tang et al. |
| 8,390,729 B2 | 3/2013 | Long et al. |
| 8,391,697 B2 | 3/2013 | Cho et al. |
| 8,395,851 B2 | 3/2013 | Tang et al. |
| 8,400,555 B1 | 3/2013 | Georgiev et al. |
| 8,400,717 B2 | 3/2013 | Chen et al. |

(56) References Cited

U.S. PATENT DOCUMENTS

| | | |
|---|---|---|
| 8,439,265 B2 | 5/2013 | Ferren et al. |
| 8,446,484 B2 | 5/2013 | Muukki et al. |
| 8,451,549 B2 | 5/2013 | Yamanaka et al. |
| 8,483,452 B2 | 7/2013 | Ueda et al. |
| 8,503,107 B2 | 8/2013 | Chen et al. |
| 8,514,491 B2 | 8/2013 | Duparre |
| 8,514,502 B2 | 8/2013 | Chen |
| 8,547,389 B2 | 10/2013 | Hoppe et al. |
| 8,553,106 B2 | 10/2013 | Scarff |
| 8,570,668 B2 | 10/2013 | Takakubo et al. |
| 8,587,691 B2 | 11/2013 | Takane |
| 8,619,148 B1 | 12/2013 | Watts et al. |
| 8,718,458 B2 | 5/2014 | Okuda |
| 8,752,969 B1 | 6/2014 | Kane et al. |
| 8,780,465 B2 | 7/2014 | Chae |
| 8,803,990 B2 | 8/2014 | Smith |
| 8,810,923 B2 | 8/2014 | Shinohara |
| 8,854,745 B1 | 10/2014 | Chen |
| 8,896,655 B2 | 11/2014 | Mauchly et al. |
| 8,958,164 B2 | 2/2015 | Kwon et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,229,194 B2 | 1/2016 | Yoneyama et al. |
| 9,235,036 B2 | 1/2016 | Kato et al. |
| 9,241,111 B1 * | 1/2016 | Baldwin ............. H04N 23/45 |
| 9,270,875 B2 | 2/2016 | Brisedoux et al. |
| 9,279,957 B2 | 3/2016 | Kanda et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,488,802 B2 | 11/2016 | Chen et al. |
| 9,568,712 B2 | 2/2017 | Dror et al. |
| 9,578,257 B2 | 2/2017 | Attar et al. |
| 9,618,748 B2 | 4/2017 | Munger et al. |
| 9,678,310 B2 | 6/2017 | Iwasaki et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,817,213 B2 | 11/2017 | Mercado |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0118471 A1 | 8/2002 | Imoto |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0048542 A1 | 3/2003 | Enomoto |
| 2003/0093805 A1 | 5/2003 | Gin |
| 2003/0156751 A1 | 8/2003 | Lee et al. |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0239313 A1 | 12/2004 | Godkin |
| 2004/0240052 A1 | 12/2004 | Minefuji et al. |
| 2005/0013509 A1 | 1/2005 | Samadani |
| 2005/0041300 A1 | 2/2005 | Oshima et al. |
| 2005/0046740 A1 | 3/2005 | Davis |
| 2005/0062346 A1 | 3/2005 | Sasaki |
| 2005/0128604 A1 | 6/2005 | Kuba |
| 2005/0134697 A1 | 6/2005 | Mikkonen et al. |
| 2005/0141103 A1 | 6/2005 | Nishina |
| 2005/0141390 A1 | 6/2005 | Lee et al. |
| 2005/0157184 A1 | 7/2005 | Nakanishi et al. |
| 2005/0168834 A1 | 8/2005 | Matsumoto et al. |
| 2005/0168840 A1 | 8/2005 | Kobayashi et al. |
| 2005/0185049 A1 | 8/2005 | Iwai et al. |
| 2005/0200718 A1 | 9/2005 | Lee |
| 2005/0248667 A1 | 11/2005 | Schweng et al. |
| 2005/0270667 A1 | 12/2005 | Gurevich et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0126737 A1 | 6/2006 | Boice et al. |
| 2006/0170793 A1 | 8/2006 | Pasquarette et al. |
| 2006/0175549 A1 | 8/2006 | Miller et al. |
| 2006/0181619 A1 | 8/2006 | Liow et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2006/0238902 A1 | 10/2006 | Nakashima et al. |
| 2006/0275025 A1 | 12/2006 | Labaziewicz et al. |
| 2007/0024737 A1 | 2/2007 | Nakamura et al. |
| 2007/0126911 A1 | 6/2007 | Nanjo |
| 2007/0127040 A1 | 6/2007 | Davidovici |
| 2007/0159344 A1 | 7/2007 | Kisacanin |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0229983 A1 | 10/2007 | Saori |
| 2007/0247726 A1 | 10/2007 | Sudoh |
| 2007/0253689 A1 | 11/2007 | Nagai et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0056698 A1 | 3/2008 | Lee et al. |
| 2008/0084484 A1 | 4/2008 | Ochi et al. |
| 2008/0088942 A1 | 4/2008 | Seo |
| 2008/0094730 A1 | 4/2008 | Toma et al. |
| 2008/0094738 A1 | 4/2008 | Lee |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0291531 A1 | 11/2008 | Heimer |
| 2008/0304161 A1 | 12/2008 | Souma |
| 2009/0002839 A1 | 1/2009 | Sato |
| 2009/0067063 A1 | 3/2009 | Asami et al. |
| 2009/0086074 A1 | 4/2009 | Li et al. |
| 2009/0102948 A1 | 4/2009 | Scherling |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0122423 A1 | 5/2009 | Park et al. |
| 2009/0128644 A1 | 5/2009 | Camp et al. |
| 2009/0135245 A1 | 5/2009 | Luo et al. |
| 2009/0141365 A1 | 6/2009 | Jannard et al. |

(56) References Cited

U.S. PATENT DOCUMENTS

| | | |
|---|---|---|
| 2009/0147368 A1 | 6/2009 | Oh et al. |
| 2009/0168135 A1 | 7/2009 | Yu et al. |
| 2009/0200451 A1 | 8/2009 | Conners |
| 2009/0219547 A1 | 9/2009 | Kauhanen et al. |
| 2009/0225438 A1 | 9/2009 | Kubota |
| 2009/0234542 A1 | 9/2009 | Orlewski |
| 2009/0252484 A1 | 10/2009 | Hasuda et al. |
| 2009/0279191 A1 | 11/2009 | Yu |
| 2009/0295949 A1 | 12/2009 | Ojala |
| 2009/0303620 A1 | 12/2009 | Abe et al. |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0033844 A1 | 2/2010 | Katano |
| 2010/0060746 A9 | 3/2010 | Olsen et al. |
| 2010/0060995 A1 | 3/2010 | Yumiki et al. |
| 2010/0097444 A1 | 4/2010 | Lablans |
| 2010/0103194 A1 | 4/2010 | Chen et al. |
| 2010/0134621 A1 | 6/2010 | Namkoong et al. |
| 2010/0165131 A1 | 7/2010 | Makimoto et al. |
| 2010/0165476 A1 | 7/2010 | Eguchi |
| 2010/0196001 A1 | 8/2010 | Ryynänen et al. |
| 2010/0202068 A1 | 8/2010 | Ito |
| 2010/0214664 A1 | 8/2010 | Chia |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0265331 A1 | 10/2010 | Tanaka |
| 2010/0277813 A1 | 11/2010 | Ito |
| 2010/0283842 A1 | 11/2010 | Guissin et al. |
| 2010/0321494 A1 | 12/2010 | Peterson et al. |
| 2011/0001838 A1 | 1/2011 | Lee |
| 2011/0032409 A1 | 2/2011 | Rossi et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0080655 A1 | 4/2011 | Mori |
| 2011/0102667 A1 | 5/2011 | Chua et al. |
| 2011/0102911 A1 | 5/2011 | Iwasaki |
| 2011/0115965 A1 | 5/2011 | Engelhardt et al. |
| 2011/0121666 A1 | 5/2011 | Park et al. |
| 2011/0128288 A1 | 6/2011 | Petrou et al. |
| 2011/0149119 A1 | 6/2011 | Matsui |
| 2011/0157430 A1 | 6/2011 | Hosoya et al. |
| 2011/0164172 A1 | 7/2011 | Shintani et al. |
| 2011/0188121 A1 | 8/2011 | Goring et al. |
| 2011/0221599 A1 | 9/2011 | Högasten |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0249347 A1 | 10/2011 | Kubota |
| 2011/0285714 A1 | 11/2011 | Swic et al. |
| 2011/0298966 A1 | 12/2011 | Kirschstein et al. |
| 2012/0014682 A1 | 1/2012 | David et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0062783 A1 | 3/2012 | Tang et al. |
| 2012/0069235 A1 | 3/2012 | Imai |
| 2012/0069455 A1 | 3/2012 | Lin et al. |
| 2012/0075489 A1 | 3/2012 | Nishihara |
| 2012/0092777 A1 | 4/2012 | Tochigi et al. |
| 2012/0105579 A1 | 5/2012 | Jeon et al. |
| 2012/0105708 A1 | 5/2012 | Hagiwara |
| 2012/0124525 A1 | 5/2012 | Kang |
| 2012/0147489 A1 | 6/2012 | Matsuoka |
| 2012/0154547 A1 | 6/2012 | Aizawa |
| 2012/0154614 A1 | 6/2012 | Moriya et al. |
| 2012/0154929 A1 | 6/2012 | Tsai et al. |
| 2012/0194923 A1 | 8/2012 | Um |
| 2012/0196648 A1 | 8/2012 | Havens et al. |
| 2012/0229663 A1 | 9/2012 | Nelson et al. |
| 2012/0229920 A1 | 9/2012 | Otsu et al. |
| 2012/0249815 A1 | 10/2012 | Bohn et al. |
| 2012/0262806 A1 | 10/2012 | Lin et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0002933 A1 | 1/2013 | Topliss et al. |
| 2013/0016427 A1 | 1/2013 | Sugawara |
| 2013/0057971 A1 | 3/2013 | Zhao et al. |
| 2013/0063629 A1 | 3/2013 | Webster et al. |
| 2013/0076922 A1 | 3/2013 | Shihoh et al. |
| 2013/0088788 A1 | 4/2013 | You |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0148854 A1 | 6/2013 | Wang et al. |
| 2013/0155176 A1 | 6/2013 | Paripally et al. |
| 2013/0163085 A1 | 6/2013 | Lim et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0208178 A1 | 8/2013 | Park |
| 2013/0229544 A1 | 9/2013 | Bando |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0258048 A1 | 10/2013 | Wang et al. |
| 2013/0270419 A1 | 10/2013 | Singh et al. |
| 2013/0271852 A1 | 10/2013 | Schuster |
| 2013/0278785 A1 | 10/2013 | Nomura et al. |
| 2013/0279032 A1 | 10/2013 | Suigetsu et al. |
| 2013/0286221 A1 | 10/2013 | Shechtman et al. |
| 2013/0286488 A1 | 10/2013 | Chae |
| 2013/0321668 A1 | 12/2013 | Kamath |
| 2014/0009631 A1 | 1/2014 | Topliss |
| 2014/0022436 A1 | 1/2014 | Kim et al. |
| 2014/0049615 A1 | 2/2014 | Uwagawa |
| 2014/0063616 A1 | 3/2014 | Okano et al. |
| 2014/0092487 A1 | 4/2014 | Chen et al. |
| 2014/0118584 A1 | 5/2014 | Lee et al. |
| 2014/0139719 A1 | 5/2014 | Fukaya et al. |
| 2014/0146216 A1 | 5/2014 | Okumura |
| 2014/0160311 A1 | 6/2014 | Hwang et al. |
| 2014/0160581 A1 | 6/2014 | Cho et al. |
| 2014/0192224 A1 | 7/2014 | Laroia |
| 2014/0192238 A1 | 7/2014 | Attar et al. |
| 2014/0192253 A1 | 7/2014 | Laroia |
| 2014/0204480 A1 | 7/2014 | Jo et al. |
| 2014/0218587 A1 | 8/2014 | Shah |
| 2014/0240853 A1 | 8/2014 | Kubota et al. |
| 2014/0285907 A1 | 9/2014 | Tang et al. |
| 2014/0293453 A1 | 10/2014 | Ogino et al. |
| 2014/0313316 A1 | 10/2014 | Olsson et al. |
| 2014/0362242 A1 | 12/2014 | Takizawa |
| 2014/0362274 A1 | 12/2014 | Christie et al. |
| 2014/0376090 A1 | 12/2014 | Terajima |
| 2014/0379103 A1 | 12/2014 | Ishikawa et al. |
| 2015/0002683 A1 | 1/2015 | Hu et al. |
| 2015/0002684 A1 | 1/2015 | Kuchiki |
| 2015/0022896 A1 | 1/2015 | Cho et al. |
| 2015/0029601 A1 | 1/2015 | Dror et al. |
| 2015/0042870 A1 | 2/2015 | Chan et al. |
| 2015/0070781 A1 | 3/2015 | Cheng et al. |
| 2015/0086127 A1 | 3/2015 | Camilus et al. |
| 2015/0092066 A1 | 4/2015 | Geiss et al. |
| 2015/0103147 A1 | 4/2015 | Ho et al. |
| 2015/0110345 A1 | 4/2015 | Weichselbaum |
| 2015/0116569 A1 | 4/2015 | Mercado |
| 2015/0124059 A1 | 5/2015 | Georgiev et al. |
| 2015/0138381 A1 | 5/2015 | Ahn |
| 2015/0138431 A1 | 5/2015 | Shin et al. |
| 2015/0145965 A1 | 5/2015 | Livyatan et al. |
| 2015/0153548 A1 | 6/2015 | Kim et al. |
| 2015/0154776 A1 | 6/2015 | Zhang et al. |
| 2015/0162048 A1 | 6/2015 | Hirata et al. |

(56) References Cited

U.S. PATENT DOCUMENTS

| | | |
|---|---|---|
| 2015/0168667 A1 | 6/2015 | Kudoh |
| 2015/0195458 A1 | 7/2015 | Nakayama et al. |
| 2015/0198464 A1 | 7/2015 | El Alami |
| 2015/0205068 A1 | 7/2015 | Sasaki |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0244942 A1 | 8/2015 | Shabtay et al. |
| 2015/0253532 A1 | 9/2015 | Lin |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0296112 A1 | 10/2015 | Park et al. |
| 2015/0316744 A1 | 11/2015 | Chen |
| 2015/0323757 A1 | 11/2015 | Bone |
| 2015/0334309 A1 | 11/2015 | Peng et al. |
| 2015/0373252 A1 | 12/2015 | Georgiev |
| 2015/0373263 A1 | 12/2015 | Georgiev et al. |
| 2016/0033742 A1 | 2/2016 | Huang |
| 2016/0044250 A1 | 2/2016 | Shabtay et al. |
| 2016/0062084 A1 | 3/2016 | Chen et al. |
| 2016/0062136 A1 | 3/2016 | Nomura et al. |
| 2016/0070088 A1 | 3/2016 | Koguchi |
| 2016/0085089 A1 | 3/2016 | Mercado |
| 2016/0105616 A1 | 4/2016 | Shabtay et al. |
| 2016/0154066 A1 | 6/2016 | Hioka et al. |
| 2016/0154202 A1 | 6/2016 | Wippermann et al. |
| 2016/0154204 A1 | 6/2016 | Lim et al. |
| 2016/0187631 A1 | 6/2016 | Choi et al. |
| 2016/0202455 A1 | 7/2016 | Aschwanden et al. |
| 2016/0212333 A1 | 7/2016 | Liege et al. |
| 2016/0212358 A1 | 7/2016 | Shikata |
| 2016/0212418 A1 | 7/2016 | Demirdjian et al. |
| 2016/0238834 A1 | 8/2016 | Erlich et al. |
| 2016/0241751 A1 | 8/2016 | Park |
| 2016/0241756 A1 | 8/2016 | Chen |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0301868 A1 | 10/2016 | Acharya et al. |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0342095 A1 | 11/2016 | Bieling et al. |
| 2016/0349504 A1 | 12/2016 | Kim et al. |
| 2016/0353008 A1 | 12/2016 | Osborne |
| 2016/0353012 A1 | 12/2016 | Kao et al. |
| 2016/0381289 A1 | 12/2016 | Kim et al. |
| 2017/0001577 A1 | 1/2017 | Seagraves et al. |
| 2017/0019616 A1 | 1/2017 | Zhu et al. |
| 2017/0023778 A1 | 1/2017 | Inoue |
| 2017/0070731 A1 | 3/2017 | Darling et al. |
| 2017/0094187 A1 | 3/2017 | Sharma et al. |
| 2017/0102522 A1 | 4/2017 | Jo |
| 2017/0115471 A1 | 4/2017 | Shinohara |
| 2017/0124987 A1 | 5/2017 | Kim et al. |
| 2017/0150061 A1 | 5/2017 | Shabtay et al. |
| 2017/0153422 A1 | 6/2017 | Tang et al. |
| 2017/0160511 A1 | 6/2017 | Kim et al. |
| 2017/0187962 A1 | 6/2017 | Lee et al. |
| 2017/0199360 A1 | 7/2017 | Chang |
| 2017/0214846 A1 | 7/2017 | Du et al. |
| 2017/0214866 A1 | 7/2017 | Zhu et al. |
| 2017/0219749 A1 | 8/2017 | Hou et al. |
| 2017/0242225 A1 | 8/2017 | Fiske |
| 2017/0276911 A1 | 9/2017 | Huang |
| 2017/0276954 A1 | 9/2017 | Bajorins et al. |
| 2017/0289458 A1 | 10/2017 | Song et al. |
| 2017/0310952 A1 | 10/2017 | Adomat et al. |
| 2017/0329108 A1 | 11/2017 | Hashimoto |
| 2017/0337703 A1 | 11/2017 | Wu et al. |
| 2018/0003925 A1 | 1/2018 | Shmunk |
| 2018/0013944 A1 | 1/2018 | Evans, V et al. |
| 2018/0017844 A1 | 1/2018 | Yu et al. |
| 2018/0024319 A1 | 1/2018 | Lai et al. |
| 2018/0024329 A1 | 1/2018 | Goldenberg et al. |
| 2018/0059365 A1 | 3/2018 | Bone et al. |
| 2018/0059376 A1 | 3/2018 | Lin et al. |
| 2018/0059379 A1 | 3/2018 | Chou |
| 2018/0081149 A1 | 3/2018 | Bae et al. |
| 2018/0109660 A1 | 4/2018 | Yoon et al. |
| 2018/0109710 A1 | 4/2018 | Lee et al. |
| 2018/0120674 A1 | 5/2018 | Avivi et al. |
| 2018/0149835 A1 | 5/2018 | Park |
| 2018/0150973 A1 | 5/2018 | Tang et al. |
| 2018/0176426 A1 | 6/2018 | Wei et al. |
| 2018/0184010 A1 | 6/2018 | Cohen et al. |
| 2018/0196236 A1 | 7/2018 | Ohashi et al. |
| 2018/0196238 A1 | 7/2018 | Goldenberg et al. |
| 2018/0198897 A1 | 7/2018 | Tang et al. |
| 2018/0217475 A1 | 8/2018 | Goldenberg et al. |
| 2018/0218224 A1 | 8/2018 | Olmstead et al. |
| 2018/0224630 A1 | 8/2018 | Lee et al. |
| 2018/0241922 A1 | 8/2018 | Baldwin et al. |
| 2018/0268226 A1 | 9/2018 | Shashua et al. |
| 2018/0295292 A1 | 10/2018 | Lee et al. |
| 2018/0300901 A1 | 10/2018 | Wakai et al. |
| 2018/0329281 A1 | 11/2018 | Ye |
| 2018/0368656 A1 | 12/2018 | Austin et al. |
| 2019/0025549 A1 | 1/2019 | Hsueh et al. |
| 2019/0025554 A1 | 1/2019 | Son |
| 2019/0075284 A1 | 3/2019 | Ono |
| 2019/0086638 A1 | 3/2019 | Lee |
| 2019/0100156 A1 | 4/2019 | Chung et al. |
| 2019/0107651 A1 | 4/2019 | Sade |
| 2019/0121103 A1 | 4/2019 | Bachar et al. |
| 2019/0121216 A1 | 4/2019 | Shabtay et al. |
| 2019/0130822 A1 | 5/2019 | Jung et al. |
| 2019/0155002 A1 | 5/2019 | Shabtay et al. |
| 2019/0170965 A1 | 6/2019 | Shabtay |
| 2019/0196148 A1 | 6/2019 | Yao et al. |
| 2019/0213712 A1* | 7/2019 | Shoa Hassani Lashdan ............... G06T 7/248 |
| 2019/0215440 A1 | 7/2019 | Rivard et al. |
| 2019/0222758 A1 | 7/2019 | Goldenberg et al. |
| 2019/0228562 A1 | 7/2019 | Song |
| 2019/0297238 A1 | 9/2019 | Klosterman |
| 2019/0353874 A1 | 11/2019 | Yeh et al. |
| 2020/0064597 A1* | 2/2020 | Shabtay ............... H04N 23/55 |
| 2020/0084358 A1 | 3/2020 | Nadamoto |
| 2020/0092486 A1 | 3/2020 | Guo et al. |
| 2020/0103726 A1 | 4/2020 | Shabtay et al. |
| 2020/0104034 A1 | 4/2020 | Lee et al. |
| 2020/0134848 A1 | 4/2020 | El-Khamy et al. |
| 2020/0192069 A1 | 6/2020 | Makeev et al. |
| 2020/0221026 A1 | 7/2020 | Fridman et al. |
| 2020/0264403 A1 | 8/2020 | Bachar et al. |
| 2020/0333691 A1 | 10/2020 | Shabtay et al. |
| 2020/0389580 A1 | 12/2020 | Kodama et al. |
| 2020/0400926 A1 | 12/2020 | Bachar |
| 2021/0048628 A1 | 2/2021 | Shabtay et al. |
| 2021/0180989 A1 | 6/2021 | Fukumura et al. |
| 2021/0263276 A1 | 8/2021 | Huang et al. |
| 2021/0333521 A9 | 10/2021 | Yedid et al. |
| 2021/0364746 A1 | 11/2021 | Chen |
| 2021/0396974 A1 | 12/2021 | Kuo |
| 2022/0046151 A1 | 2/2022 | Shabtay et al. |
| 2022/0066168 A1 | 3/2022 | Shi |
| 2022/0113511 A1 | 4/2022 | Chen |
| 2022/0232167 A1 | 7/2022 | Shabtay et al. |
| 2022/0252963 A1 | 8/2022 | Shabtay et al. |

FOREIGN PATENT DOCUMENTS

| | | |
|---|---|---|
| CN | 201514511 U | 6/2010 |
| CN | 102147519 A | 8/2011 |
| CN | 102193162 A | 9/2011 |
| CN | 102215373 A | 10/2011 |
| CN | 102466865 A | 5/2012 |
| CN | 102466867 A | 5/2012 |

(56) References Cited

FOREIGN PATENT DOCUMENTS

| | | |
|---|---|---|
| CN | 102739949 A | 10/2012 |
| CN | 102147519 B | 1/2013 |
| CN | 102982518 A | 3/2013 |
| CN | 103024272 A | 4/2013 |
| CN | 203406908 U | 1/2014 |
| CN | 103576290 A | 2/2014 |
| CN | 103698876 A | 4/2014 |
| CN | 103841404 A | 6/2014 |
| CN | 104297906 A | 1/2015 |
| CN | 104407432 A | 3/2015 |
| CN | 105467563 A | 4/2016 |
| CN | 105657290 A | 6/2016 |
| CN | 205301703 U | 6/2016 |
| CN | 105827903 A | 8/2016 |
| CN | 105847662 A | 8/2016 |
| CN | 106680974 A | 5/2017 |
| CN | 104570280 B | 6/2017 |
| CN | 107608052 A | 1/2018 |
| CN | 107682489 A | 2/2018 |
| CN | 109729266 A | 5/2019 |
| EP | 1536633 A1 | 6/2005 |
| EP | 1780567 A1 | 5/2007 |
| EP | 2523450 A1 | 11/2012 |
| JP | S54157620 A | 12/1979 |
| JP | S59121015 A | 7/1984 |
| JP | S59191146 A | 10/1984 |
| JP | 6165212 A | 4/1986 |
| JP | S6370211 A | 3/1988 |
| JP | H0233117 A | 2/1990 |
| JP | 04211230 A | 8/1992 |
| JP | 406059195 A | 3/1994 |
| JP | H07318864 A | 12/1995 |
| JP | H07325246 A | 12/1995 |
| JP | H07333505 A | 12/1995 |
| JP | 08271976 A | 10/1996 |
| JP | H09211326 A | 8/1997 |
| JP | H11223771 A | 8/1999 |
| JP | 3210242 B2 | 9/2001 |
| JP | 2002010276 A | 1/2002 |
| JP | 2003298920 A | 10/2003 |
| JP | 2003304024 A | 10/2003 |
| JP | 2004056779 A | 2/2004 |
| JP | 2004133054 A | 4/2004 |
| JP | 2004245982 A | 9/2004 |
| JP | 2004334185 A | 11/2004 |
| JP | 2005099265 A | 4/2005 |
| JP | 2005122084 A | 5/2005 |
| JP | 2005321592 A | 11/2005 |
| JP | 2006195139 A | 7/2006 |
| JP | 2006237914 A | 9/2006 |
| JP | 2006238325 A | 9/2006 |
| JP | 2007133096 A | 5/2007 |
| JP | 2007164065 A | 6/2007 |
| JP | 2007219199 A | 8/2007 |
| JP | 2007228006 A | 9/2007 |
| JP | 2007306282 A | 11/2007 |
| JP | 2008076485 A | 4/2008 |
| JP | 2008111876 A | 5/2008 |
| JP | 2008191423 A | 8/2008 |
| JP | 2008271026 A | 11/2008 |
| JP | 2010032936 A | 2/2010 |
| JP | 2010164841 A | 7/2010 |
| JP | 2010204341 A | 9/2010 |
| JP | 2011055246 A | 3/2011 |
| JP | 2011085666 A | 4/2011 |
| JP | 2011138407 A | 7/2011 |
| JP | 2011145315 A | 7/2011 |
| JP | 2011203283 A | 10/2011 |
| JP | 2012132739 A | 7/2012 |
| JP | 2012203234 A | 10/2012 |
| JP | 2013003317 A | 1/2013 |
| JP | 2013003754 A | 1/2013 |
| JP | 2013101213 A | 5/2013 |
| JP | 2013105049 A | 5/2013 |
| JP | 2013106289 A | 5/2013 |
| JP | 2013148823 A | 8/2013 |
| JP | 2014142542 A | 8/2014 |
| JP | 2016105577 A | 6/2016 |
| JP | 2017116679 A | 6/2017 |
| JP | 2017146440 A | 8/2017 |
| JP | 2018059969 A | 4/2018 |
| JP | 2019113878 A | 7/2019 |
| KR | 20070005946 A | 1/2007 |
| KR | 20090019525 A | 2/2009 |
| KR | 20090058229 A | 6/2009 |
| KR | 20090131805 A | 12/2009 |
| KR | 20100008936 A | 1/2010 |
| KR | 20110058094 A | 6/2011 |
| KR | 20110080590 A | 7/2011 |
| KR | 20110115391 A | 10/2011 |
| KR | 20120068177 A | 6/2012 |
| KR | 20140135909 A | 5/2013 |
| KR | 20130104764 A | 9/2013 |
| KR | 1020130135805 A | 11/2013 |
| KR | 20140014787 A | 2/2014 |
| KR | 20140023552 A | 2/2014 |
| KR | 101428042 B1 | 8/2014 |
| KR | 101477178 B1 | 12/2014 |
| KR | 20140144126 A | 12/2014 |
| KR | 20150118012 A | 10/2015 |
| KR | 20160000759 A | 1/2016 |
| KR | 101632168 B1 | 6/2016 |
| KR | 20160115359 A | 10/2016 |
| KR | 20170105236 A | 9/2017 |
| KR | 20180120894 A | 11/2018 |
| KR | 20130085116 A | 6/2019 |
| TW | M602642 U | 10/2020 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2013058111 A1 | 4/2013 |
| WO | 2013063097 A1 | 5/2013 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

A 3MPixel Multi-Aperture Image Sensor with 0.7μm Pixels in 0.11μm CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 2007, 9 pages.
Superimposed multi-resolution imaging, Carles et al., Publisher: Optical Society of America, 2017, 13 pages.
Viewfinder Alignment, Adams et al., Publisher: Eurographics, 2008, 10 pages.
Dual-Camera System for Multi-Level Activity Recognition, Bodor et al., Publisher: IEEE, Oct. 2014, 6 pages.
Engineered to the task: Why camera-phone cameras are different,

(56) References Cited

OTHER PUBLICATIONS

Giles Humpston, Publisher: Solid State Technology, Jun. 2009, 3 pages.
A compact and cost effective design for cell phone zoom lens, Chang et al., Sep. 2007, 8 pages.
Consumer Electronic Optics: How small a lens can be? The case of panomorph lenses, Thibault et al., Sep. 2014, 7 pages.
Optical design of camera optics for mobile phones, Steinich et al., 2012, pp. 51-58 (8 pages).
The Optics of Miniature Digital Camera Modules, Bareau et al., 2006, 11 pages.
Modeling and measuring liquid crystal tunable lenses, Peter P. Clark, 2014, 7 pages.
Mobile Platform Optical Design, Peter P. Clark, 2014, 7 pages.
Boye et al., "Ultrathin Optics for Low-Profile Innocuous Imager", Sandia Report, 2009, pp. 56-56.
"Cheat sheet: how to understand f-stops", Internet article, Digital Camera World, 2017.
Office action in related Chinese patent application No. 202180002905.0, dated Apr. 18, 2023.

\* cited by examiner

KNOWN ART

KNOWN ART

SYSTEMS AND METHODS FOR OBTAINING A SUPER MACRO IMAGE

CROSS REFERENCE TO RELATED APPLICATIONS

This application is a continuation from U.S. patent application Ser. No. 17/600,341 filed Sep. 30, 2021 (now allowed), which was a 371 application from international application PCT/IB2021/054186 filed May 15, 2021, and is related to and claims priority from U.S. Provisional patent Applications No. 63/032,576 filed May 30, 2020, No. 63/070,501 filed on Aug. 26, 2020, No. 63/110,057 filed Nov. 5, 2020, No. 63/119,853 filed Dec. 1, 2020, No. 63/164,187 filed Mar. 22, 2021, No. 63/173,446 filed Apr. 11, 2021 and No. 63/177,427 filed Apr. 21, 2021, all of which are expressly incorporated herein by reference in their entirety.

FIELD

The subject matter disclosed herein relates in general to macro images and in particular to methods for obtaining such images with mobile telephoto ("Tele" or "T") cameras.

BACKGROUND

Multi-cameras (of which a "dual-camera" having two cameras is an example) are now standard in portable electronic mobile devices ("mobile devices", e.g. smartphones, tablets, etc.). A multi-camera usually comprises a wide field-of-view (or "angle") $FOV_W$ camera ("Wide" or "W" camera), and at least one additional camera, with a narrower (than $FOV_W$) FOV (Tele camera with $FOV_T$), or with an ultra-wide field of view $FOV_{UW}$ (wider than $FOV_W$, "UW" camera). A known dual camera including a W camera and a folded T camera is shown in FIG. 10.

A "Macro-photography" mode is becoming a popular differentiator. "Macro-photography" refers to photographing objects that are close to the camera, so that an image recorded on the image sensor is nearly as large as the actual object photographed. The ratio of object size over image size is the object-to-image magnification. For system cameras such as digital single-lens reflex camera (DSLR), a Macro image is defined by having an object-to-image magnification of about 1:1 or larger, e.g. 1:1.1. In the context of mobile devices this definition is relaxed, so that also an image with an object-to-image magnification of about 10:1 or even 15:1 is referred to as "Macro image". Known mobile devices provide Macro-photography capabilities which are usually provided by enabling very close focusing with a UW camera, which has a relatively short effective focal length (EFL) of e.g. EFL=2.5 mm.

An UW camera can focus to close range required for Macro photography (e.g., 1.5 cm to 15 cm), but its spatial resolution is poor. For example, an UW camera with EFL=2.5 mm focused to an object at 5 cm (lens-object distance) will have approximately 19:1 object-to-image magnification. This according to the thin lens equation:

$$\frac{1}{EFL} = \frac{1}{u} + \frac{1}{v}$$

with EFL=2.5 mm, a lens-image distance v=2.6 mm and an object-lens distance of u=50 mm. Even when focused as close as 1.5 cm, the object-to-image magnification of the UW camera will be approximately 5:1. Capturing objects in Macro images from these short object-lens distances of e.g. u=5 cm or less is very challenging for a user—e.g. it may make framing of the image very hard, it may prohibit taking image of popular Macro objects such as living subjects (e.g. insects), and it may introduce shadows and obscure the lighting in the scene A dedicated Macro camera may be realized with a smartphone's Tele camera. Tele cameras focused to close objects have a very shallow depth of field (DOF). Consequently, capturing Macro images in Macro-photography mode is very challenging. Popular Macro objects such as flowers or insects exhibit a significant variation in depth, and cannot be imaged all-in-focus in a single capture. It would be beneficial to have a multi camera in mobile devices that capture Macro images (i) from a larger lens-object distance (e.g. 3.0-35 cm) and (ii) with larger object-to-image magnification (e.g. 1:5-25:1).

SUMMARY

In the following and for simplicity, the terms "UW image" and "W image", "UW camera" and "W camera", "UW FOV" (or $FOV_{UW}$) and "W FOV" (or $FOV_W$) etc. may be used interchangeably. A W camera may have a larger FOV than a Tele camera or a Macro-capable Tele camera, and a UW camera may have a larger FOV than a W camera. Typically but not limiting, $FOV_T$ may be 15-40 degrees, $FOV_W$ may be 60-90 degrees and $FOV_{UW}$ may be 90-130 degrees. A W camera or a UW camera may be capable to focus to object-lens distances that are relevant for Macro photography and that may be in the range of e.g. 2.5-15 cm. In some cases (e.g. between W and UW), FOV ranges given above may overlap to a certain degree.

In various embodiments, there are provided systems, comprising: a Wide camera for providing at least one Wide image; a Tele camera comprising a Tele lens module; a lens actuator for moving the Tele lens module for focusing to any distance or set of distances between 3.0 cm and 35 cm with an object-to-image magnification between 1:5 and 25:1; and an application processor (AP) configured to analyse image data from the Wide camera to define a capture strategy for capturing with the Tele camera a sequence of Macro images with a focus plane shifted from one captured Macro image to another captured Macro image, and to generate a new Macro image from this sequence. The focus plane and the DOF of the new Macro image can be controlled continuously. In some embodiments, the continuous control may be post-capture.

In some embodiments, the Tele camera may be a folded Tele camera comprising an optical path folding element (OPFE). In some embodiments, the Tele camera may be a double-folded Tele camera comprising two OPFEs. In some embodiments, the Tele camera may be a pop-out Tele camera comprising a pop-out lens In some embodiments, the focusing may be to object-lens distances of 3.0-25 cm, of 3.0-15 cm, or of 10-35 cm.

In some embodiments, the Tele camera may have an EFL of 7-10 mm, of 10-20 mm, or of 20-40 mm.

In some embodiments, the Tele capture strategy may be adjusted during capture of the sequence of Macro images based on information from captured Macro images.

In some embodiments, the information from captured Macro images is processed by a Laplacian of Gaussian analysis.

In some embodiments, the image data from the UW camera is phase detection auto-focus (PDAF) data.

In some embodiments, generation of the new Macro image may use a UW image as reference image.

In some embodiments, the generation of the new Macro image may use a video stream of UW images as reference image.

In some embodiments, the AP may be configured to automatically detect objects of interests (OOIs) in the sequence of captured Macro images and to generate the new Macro image when the OOIs are entirely in-focus.

In some embodiments, the AP may be configured to automatically detect OOIs in the UW image data and to generate the new Macro image when the OOIs are entirely in-focus.

In some embodiments, the AP may be configured to automatically detect OOIs in the sequence of input Macro images and to generate the new Macro image when specific image segments of the OOIs have a specific amount of forward de-focus blur and a specific amount of backward de-focus blur.

In some embodiments, the AP may be configured to automatically detect OOIs in the UW image data and to generate the new Macro image when specific image segments of the OOIs have a specific amount of forward de-focus blur and a specific amount of backward de-focus blur.

In some embodiments, the AP may be configured to calculate a depth map from the sequence of captured Macro images and to use the depth map to generate the new Macro image.

In some embodiments, the AP may be configured to provide the new Macro image with realistic artificial lightning scenarios.

In some embodiments, the AP may be configured to analyse of image data from the Wide camera to automatically select an object and to define the capture strategy for capturing the object with the Tele camera. In some embodiments, a focus peaking map may be displayed to a user for selecting an object which is captured with the Tele camera.

In some embodiments, the AP may be configured to calculate a depth map from the PDAF data and to use the depth map to generate the new Macro image.

In some embodiments, the Tele lens module may include one or more D cut lenses.

In some embodiments, a system may further comprise a liquid lens used for focusing to the object-lens distances of 4-15 cm. In some embodiments, the power of the liquid lens can be changed continuously in a range of 0-30 dioptre. In some embodiments, the liquid lens may be located on top of the folded Tele camera's OPFE. In some embodiments, the liquid lens may be located between the folded Tele camera's OPFE and the Tele lens module.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by like numerals. Elements in the drawings are not necessarily drawn to scale.

DETAILED DESCRIPTION

Tele cameras with a Macro-photography mode can switch to a Macro state by performing movements within the lens of the Tele camera, thus changing the lens's properties. Cameras with such capability are described for example in co-owned international patent applications PCT/IB2020/051405 and PCT/IB2020/058697. For example, FIGS. 19A and 19B in PCT/IB2020/051405 show two folded Tele camera states: one with the Tele lens in a first "Tele lens" state and the other with the Tele lens in a second "Macro lens" state. Because of the large EFL of a Tele camera and an image region of the image sensor that is smaller in the Macro mode than it is in the Tele mode, a "Macro lens" state may come with a small Macro FOV like FOV 198 below.

In the following, images are referred to as "Macro images", if they fulfil both of the two criteria:
- Object-to-image magnification of 1:5-25:1.
- Captured at an object-lens distance in the range of 30 mm-350 mm with a camera having an EFL in the range of 7 mm-40 mm.

Figure 1A:
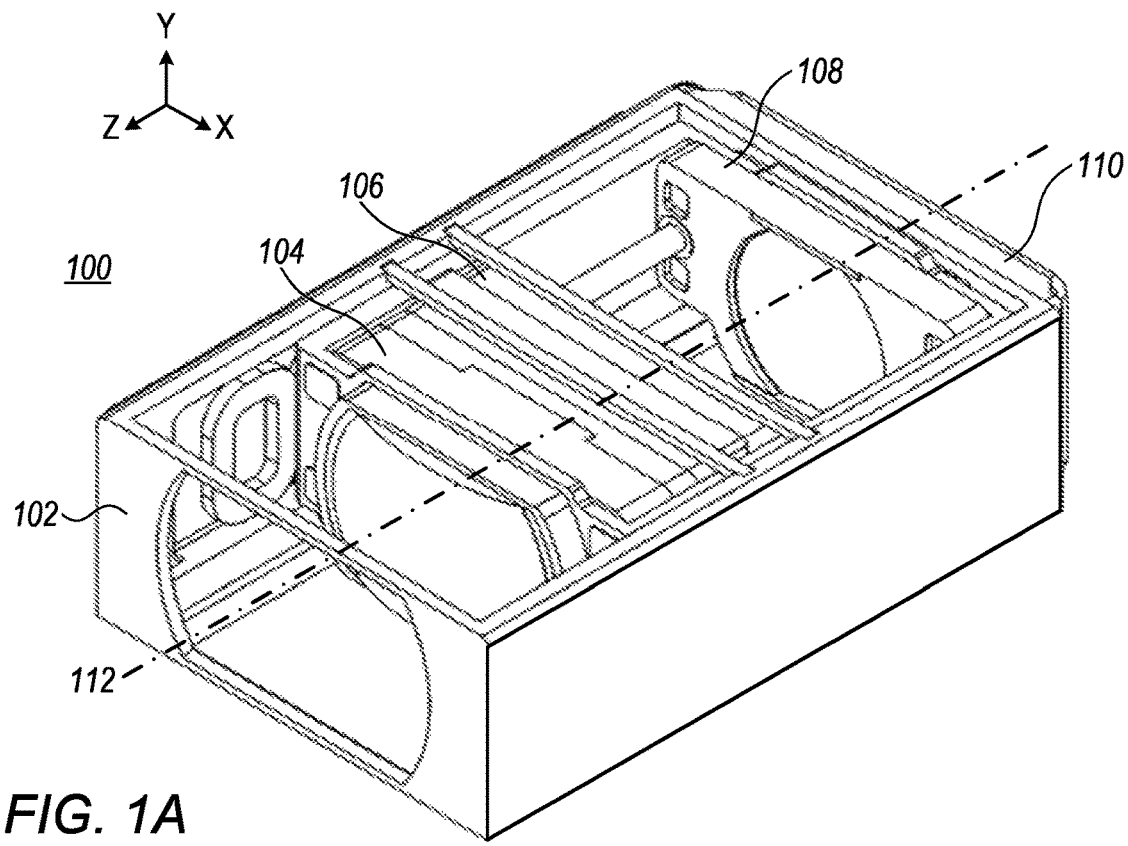
FIG. 1A shows a perspective view of an embodiment of a folded Tele lens and sensor module in a Tele lens state with focus on infinity.
Figure 1B:
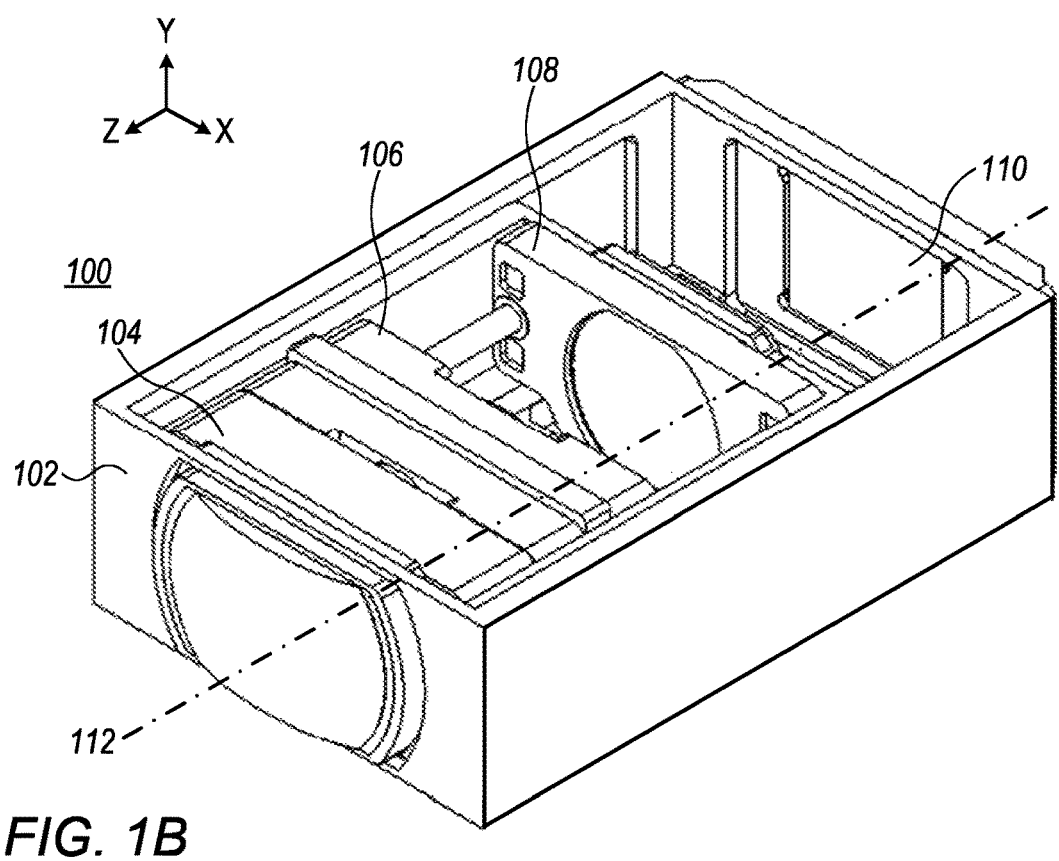
FIG. 1B shows a perspective view of the Tele lens and sensor module of FIG. 1A in a Macro lens state with focus on a close object.

FIGS. 1A and 1B show schematically an embodiment of a folded Tele lens and sensor module disclosed herein and numbered 100. FIG. 1A shows module 100 in a Tele lens state with focus on infinity from a top perspective view, and FIG. 1B shows module 100 in a Macro lens state with maximum object-to-image magnification ($M_{max}$) with a focus on a (close) object at about 4 cm from the camera from the same top perspective view.

Module 100 further comprises a first lens group (G1) 104, a second lens group (G2) 106 and a third lens group (G3) 108, a module housing 102 and an image sensor 110. In this embodiment, lens groups 104, 106 and 108 are fixedly coupled, i.e. the distances between lens groups do not change. Lens groups 104, 106 and 108 together may form a lens with an EFL=13 mm. Lens groups 104, 106 and 108 share a lens optical axis 112. For focusing, lens groups 104, 106 and 108 are actuated together by a VCM mechanism (not shown) along lens optical axis 112. A VCM mechanism (not shown) can also be used for changing between lens focus states.

With reference to FIG. 1B and to an optical design detailed in Example 6 in Table 25 of PCT/IB2020/051405, $M_{max}$=2.3:1 may be achieved (for objects at 4.2 cm), according to a thin lens approximation with EFL=13 mm, a lens-image distance v=19 mm, and an object-lens distance of u=42 mm. $M_{max}$ may be achieved with the lens configuration as shown in FIG. 1B, where lens groups G1+G2+G3 are moved together as far as possible towards the object (i.e. away from sensor 110).

A smaller object-to-image magnification M may be selected continuously by capturing the object from a larger distance. A magnification of zero (for objects at infinity) is obtained with the lens configuration of FIG. 1A and with lens groups G1+G2+G3 moved together as far as possible towards image sensor 110. For magnifications between zero and $M_{max}$, lens groups G1+G2+G3 are moved together between the limits stated above. For example, a magnification M=4.3:1 may be desired. To switch from a $M_{max}$ state to M=4.3:1, the lenses G1+G2+G3 must be moved together about 3 mm towards the image sensor.

In another embodiment a Macro camera may have an EFL of 25 mm and may be compared to a UW camera with EFL=2.5 mm described above. Both cameras may include a same image sensor, e.g., with 4 mm active image sensor width. When focused to 5 cm, the Macro camera with EFL=25 mm will have 1:1 object-to-image magnification and will capture an object width of 4 mm (same as the sensor width). In comparison, the UW camera with approximately 19:1 object-to-image magnification will capture an object width of 76 mm.

A Tele camera with an EFL=7-40 mm may be beneficial for Macro photography, as it can provide large image magnification. However, focusing a Tele camera to short object-lens distances is not trivial and requires large lens strokes that must support optics specifications such as limiting de-center deviations (with respect to a plane normal to an optical path) between lens and image sensor to 25 µm or less, e.g. to 5 µm. As an example, for focusing the Macro camera having EFL=25 mm to 10 cm (compared to focus on infinity), a lens stroke of about 6.3 mm is required. For an upright (non-folded) Tele camera, lens strokes of 2 mm or more are incompatible with mobile device (and thus camera) height constraints. However, in folded camera designs (described in FIGS. 1A-1B and FIGS. 2A-2B) or "pop-out" camera designs (described in FIGS. 1J-1K and for example in co-owned international patent application PCT/IB2020/058697) a smartphone's height does not limit such lens strokes.

In other embodiments, a folded or non-folded Tele camera for capturing Macro images may have an EFL of 7-40 mm, for example 18 mm. For Macro capability, the folded or non-folded Tele camera may be able to focus continuously to objects having an object-lens distance of e.g. 30-350 mm.

Figure 1C:
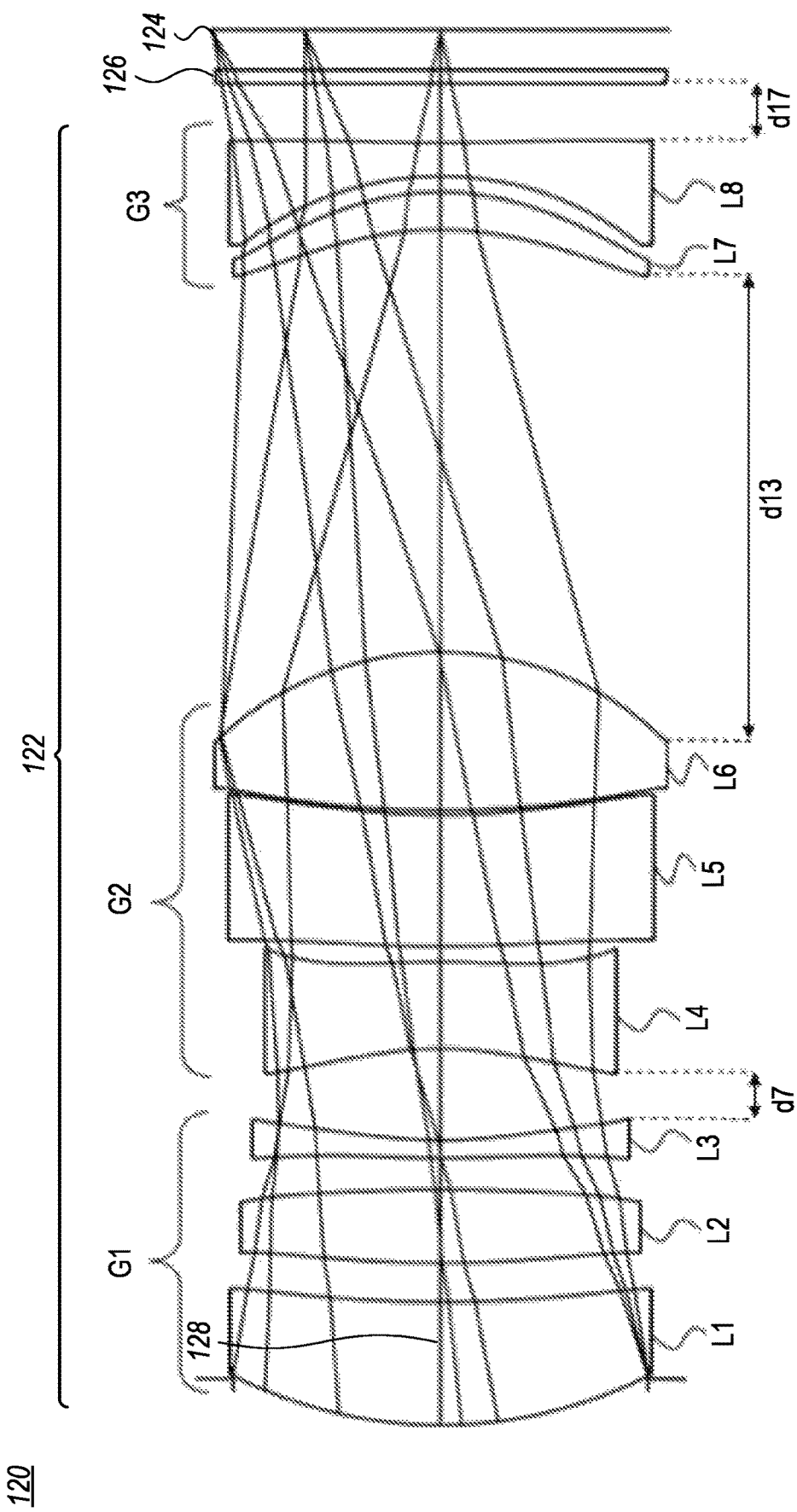
FIG. 1C shows in cross section another continuous zoom Tele lens and sensor module disclosed herein in a minimum zoom state.
Figure 1D:
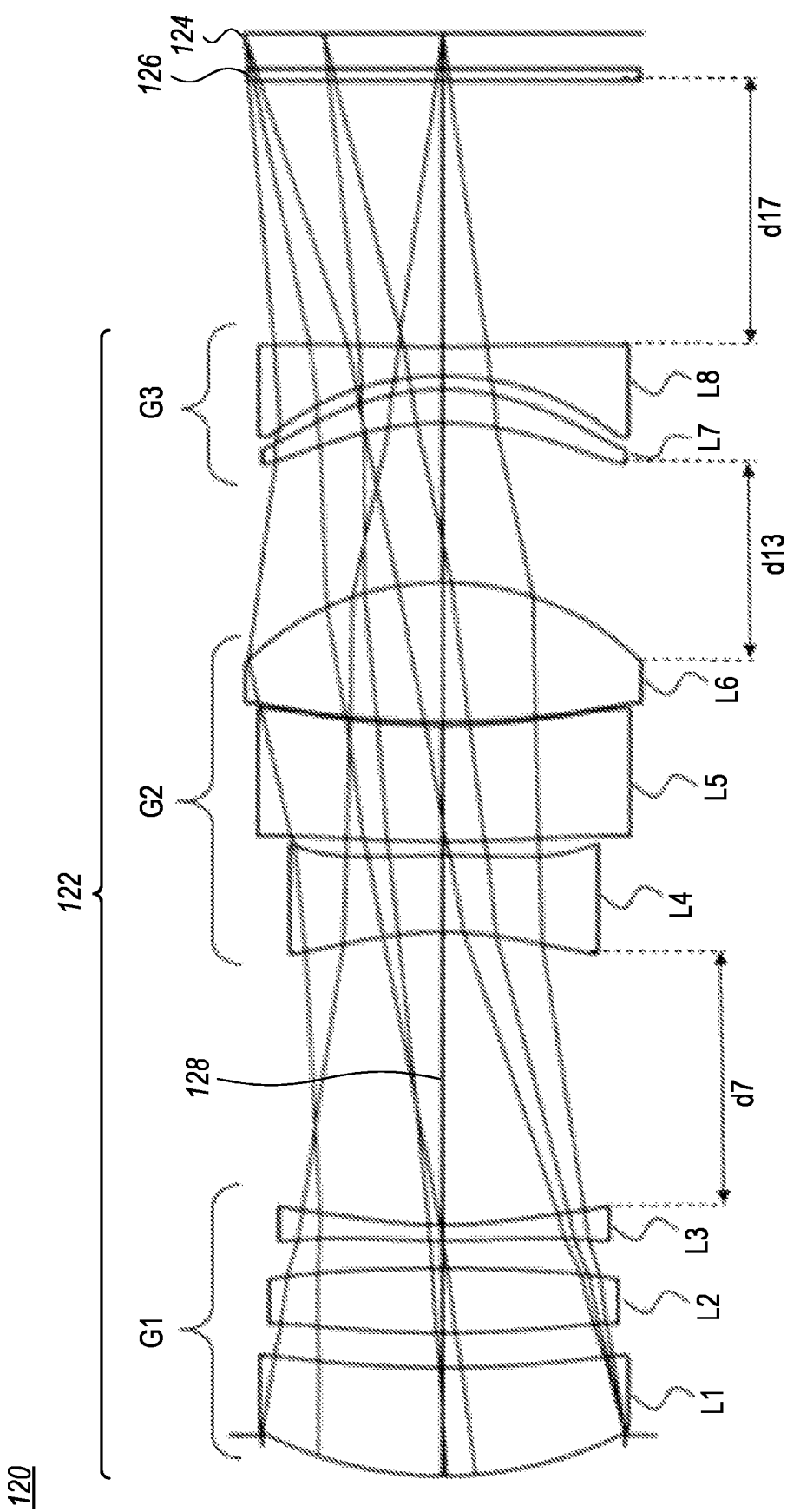
FIG. 1D shows the module of FIG. 1C in an intermediate zoom state.
Figure 1E:
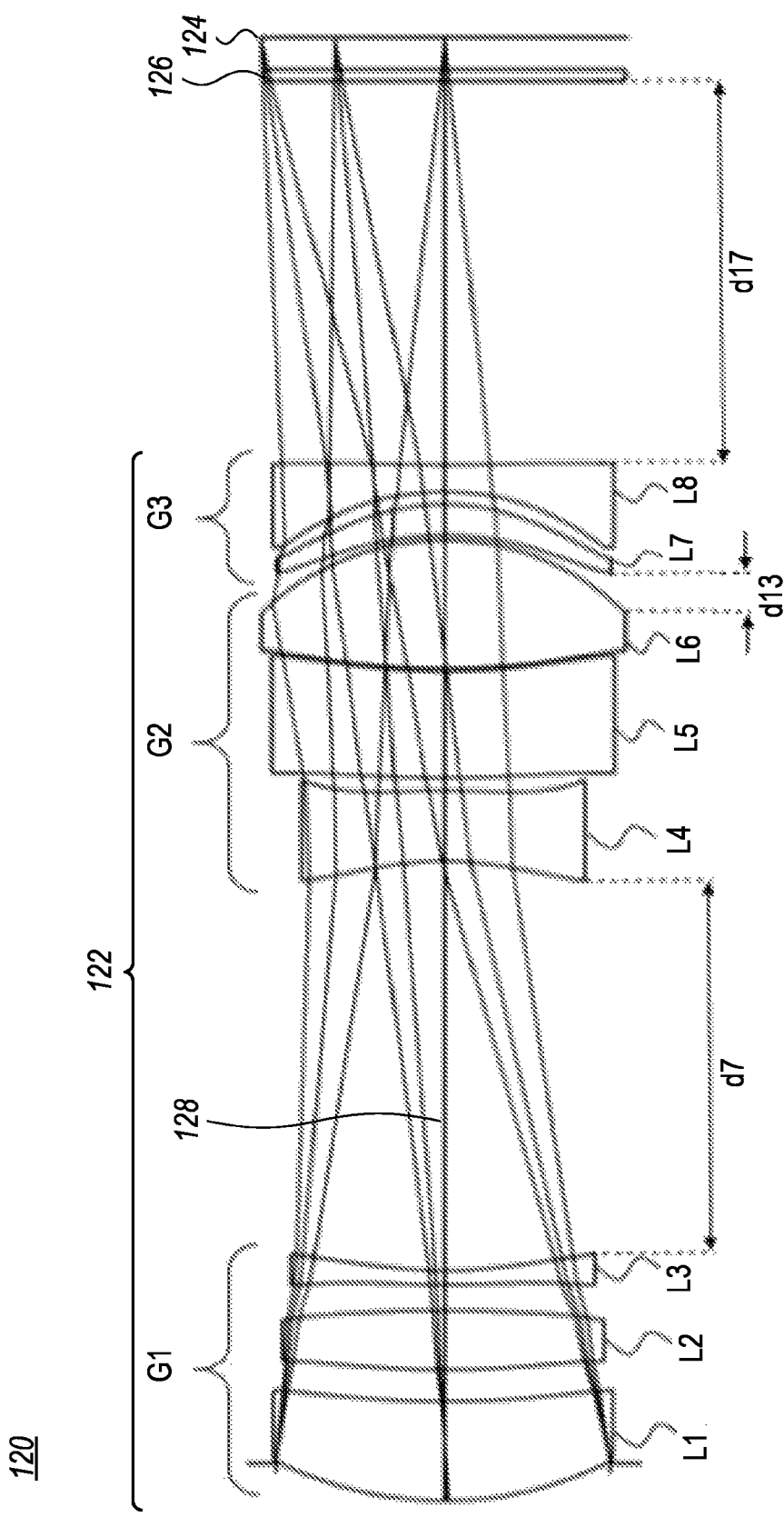
FIG. 1E shows the module of FIG. of FIG. 1C in a maximum zoom state.

FIG. 1C-E shows an embodiment of a continuous zoom Tele lens and sensor module disclosed herein and numbered 120 in different zoom states. FIG. 1C shows module 120 in its minimum zoom state, having an EFL=15 mm, FIG. 1D shows module 120 in an intermediate zoom state, having an EFL=22.5 mm, and FIG. 1E shows module 120 in its maximum zoom state, having an EFL=30 mm.

Module 120 comprises a lens 122 with 8 single lens elements L1-L8, an image sensor 124 and, optionally, an optical window 126. The optical axis is indicated by 128. Module 120 is included in a folded Tele camera such as camera 1000. Module 120 has a continuous zoom range that can be switched continuously between a minimum zoom state and a maximum zoom state. The EFL of the maximum zoom state $EFL_{MAX}$ and the EFL of the minimum zoom state $EFL_{MIN}$ fulfil $EFL_{MAX}$=2×$EFL_{MIN}$. Lens 122 is divided into three lens groups, group 1 ("G1"), which is closest to an object, group 2 ("G2") and group 3 ("G3"), which is closest to sensor 124. For changing a zoom state, G1 and G3 are moved together as one group ("G13" group) with respect to G2 and to sensor 124. For focusing, G1+G2+G3 move together as one group with respect to sensor 124.

Figure 1F:
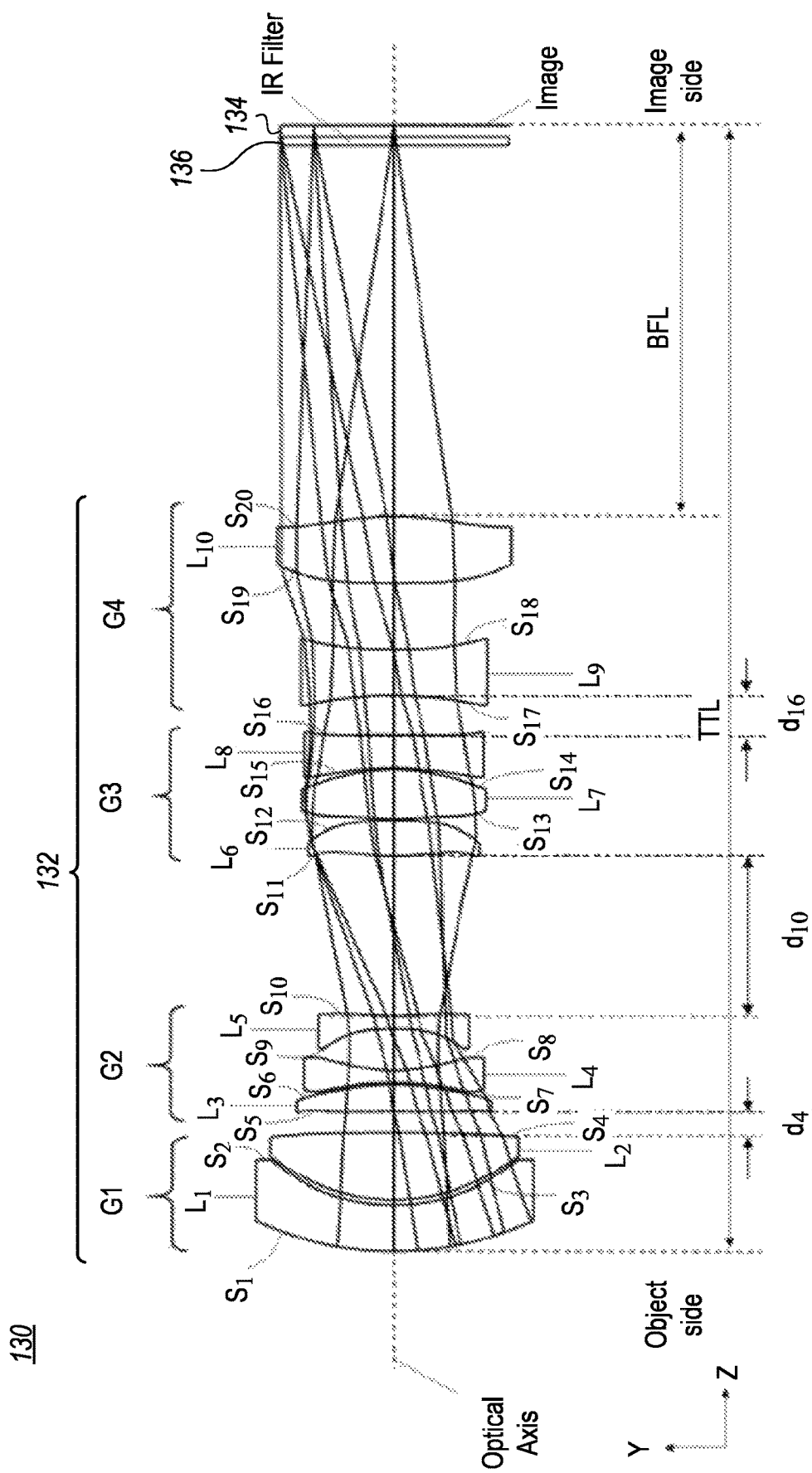
FIG. 1F shows in cross section yet another continuous zoom Tele lens and sensor module disclosed herein in a minimum zoom state.
Figure 1G:
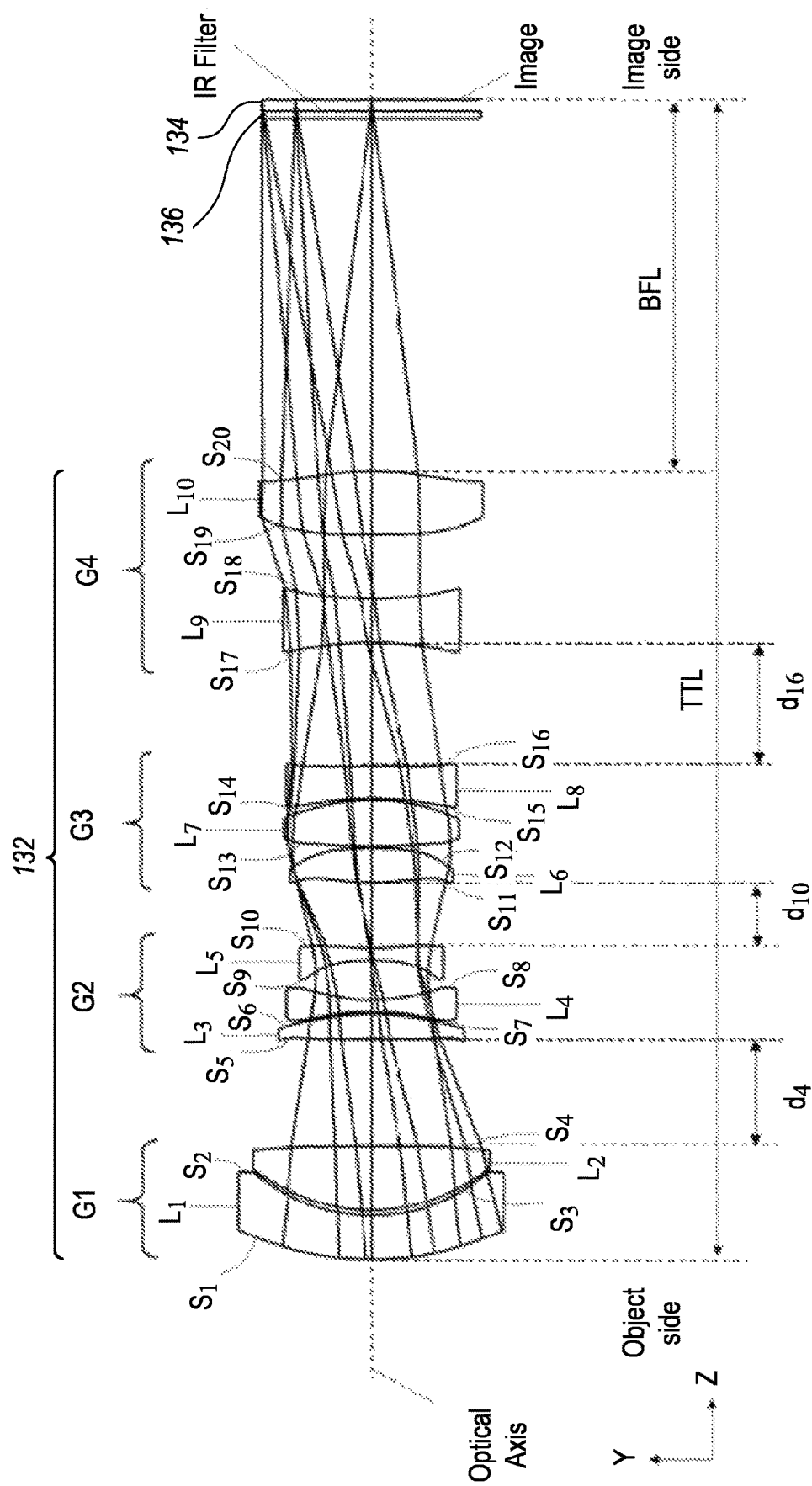
FIG. 1G shows the module of FIG. 1F in an intermediate zoom state.
Figure 1H:
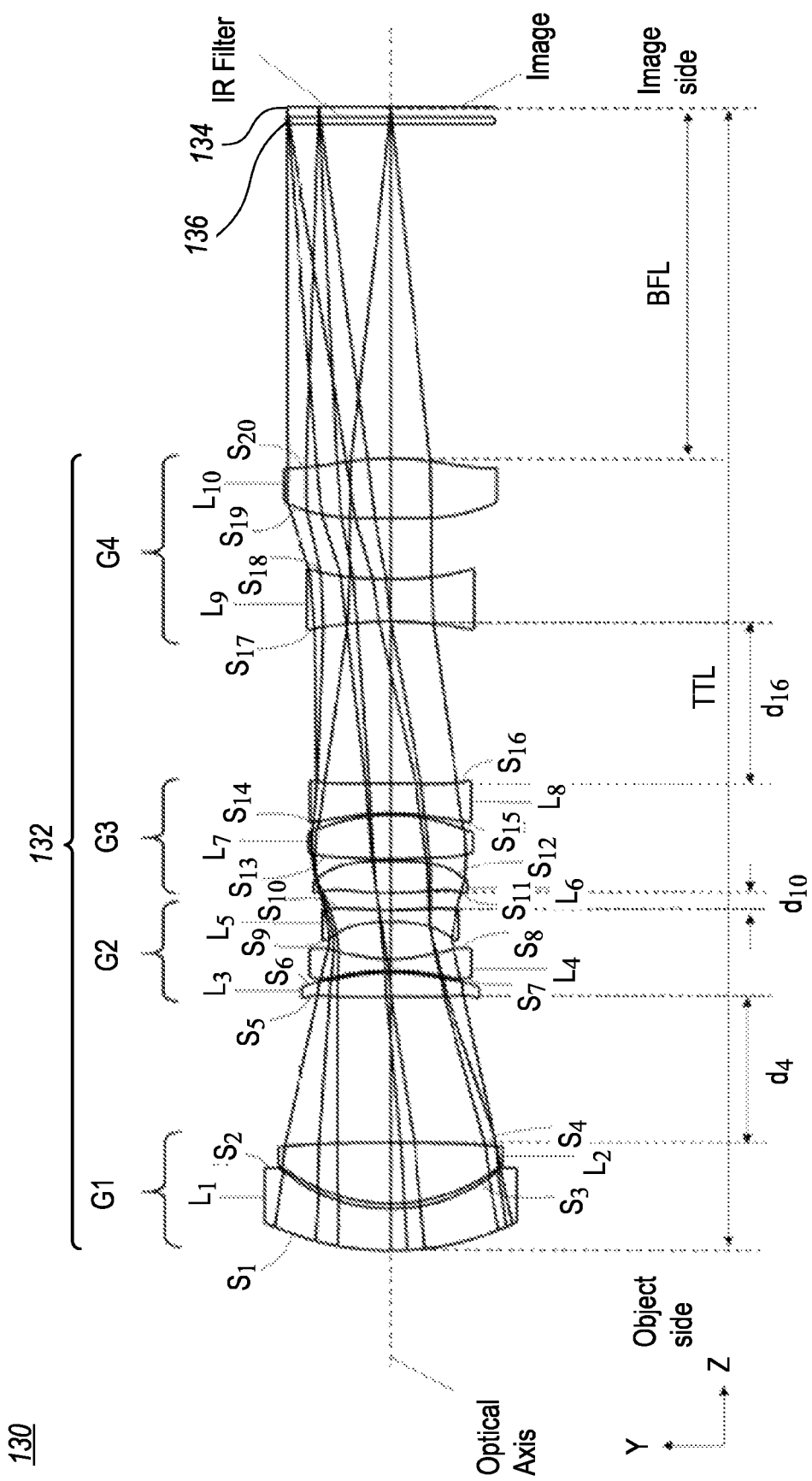
FIG. 1H shows the module of FIG. of FIG. 1F in a maximum zoom state.

FIG. 1F-H shows another embodiment of a continuous zoom Tele lens and sensor module disclosed herein and numbered 130 in different zoom states. FIG. 1F shows module 130 in its minimum zoom state, having an EFL=10 mm, FIG. 1G shows module 130 in an intermediate zoom state, having an EFL=20 mm, and FIG. 1H shows module 130 in its maximum zoom state, having an EFL=30 mm.

Module 130 comprises a lens 132 with 10 single lens elements L1-L10, an image sensor 134 and optionally an optical window 136. Module 130 is included in a folded Tele camera such as camera 1000. Module 130 has a continuous zoom range that can be switched continuously between a minimum zoom state and a maximum zoom state. The EFL of the maximum zoom state $EFL_{MAX}$ and the EFL of the minimum zoom state $EFL_{MIN}$ fulfil: $EFL_{MAX}=3\times EFL_{MIN}$. Lens 132 is divided into four lens groups, group 1 ("G1"), which is closest to an object, group 2 ("G2"), group 3 ("G3") and group 4 ("G4") which is closest to sensor 134. For changing a zoom state, G1 and G3 are moved together as one group ("G13" group) with respect to G2, G4 and to sensor 134. For focusing, G13+G2+G4 move together as one group with respect to sensor 134.

Figure 1I:
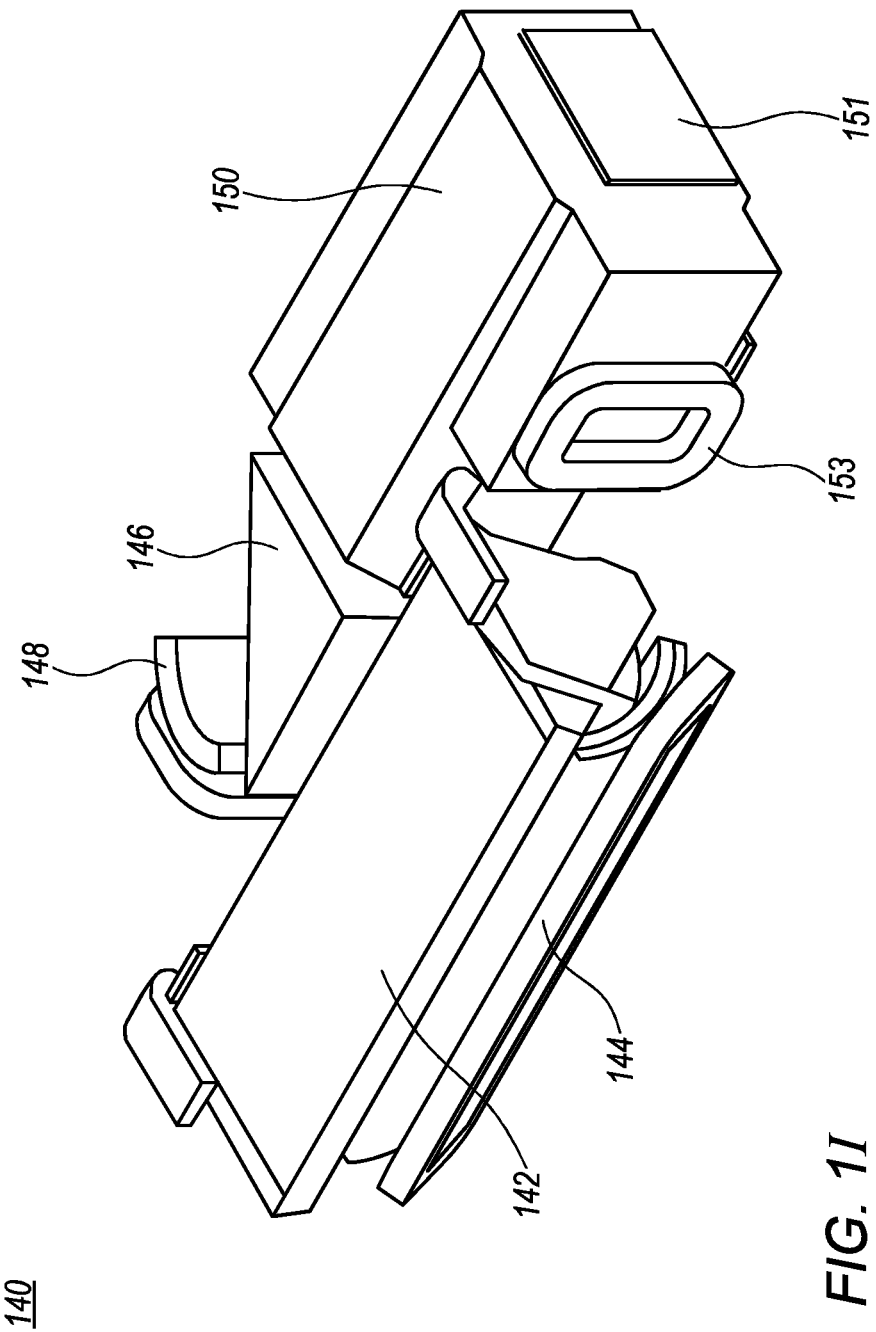
FIG. 1I shows an embodiment of a folded Tele camera disclosed herein.

FIG. 1I shows an embodiment of a folded Tele camera disclosed herein and numbered 140. In general, folded Tele cameras are based on one optical path folding element (OPFE). Such scanning folded Tele cameras are described for example in the co-owned international patent application PCT/IB2016/057366. Camera 140 is based on two OPFEs, so that one may refer to a "double-folded" Tele camera. Module 140 comprises a first "Object OPFE" 142, an Object OPFE actuator 144, an "Image OPFE" 146 and an Image OPFE actuator 148. A lens (not shown) is included in a lens barrel 150. Camera 140 further includes an image sensor 151 and a focusing actuator 153.

Module 140 is a scanning folded Tele camera. By rotational movement of Object OPFE 142 and Image OPFE 146, the native (diagonal) FOV ($FOV_N$) of camera 140 can be steered for scanning a scene. $FOV_N$ may be 10-40 degrees, and a scanning range of $FOV_N$ may be ±5 deg-±35 deg. For example, a scanning folded Tele camera with 20 deg $FOV_N$ and ±20 $FOV_N$ scanning covers a Tele FOV of 60 deg.

Figure 1J:
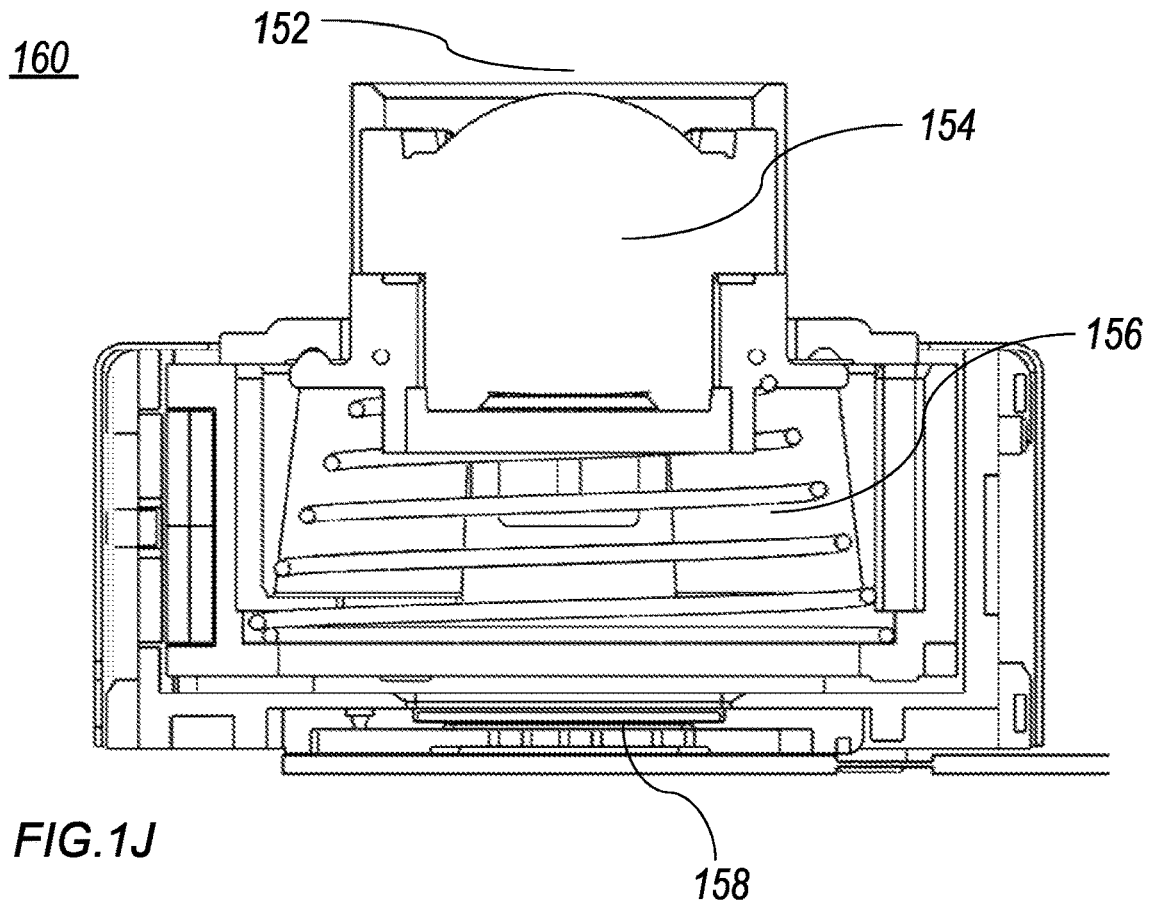
FIG. 1J shows a pop-out camera in an operational or "pop-out" state.
Figure 1K:
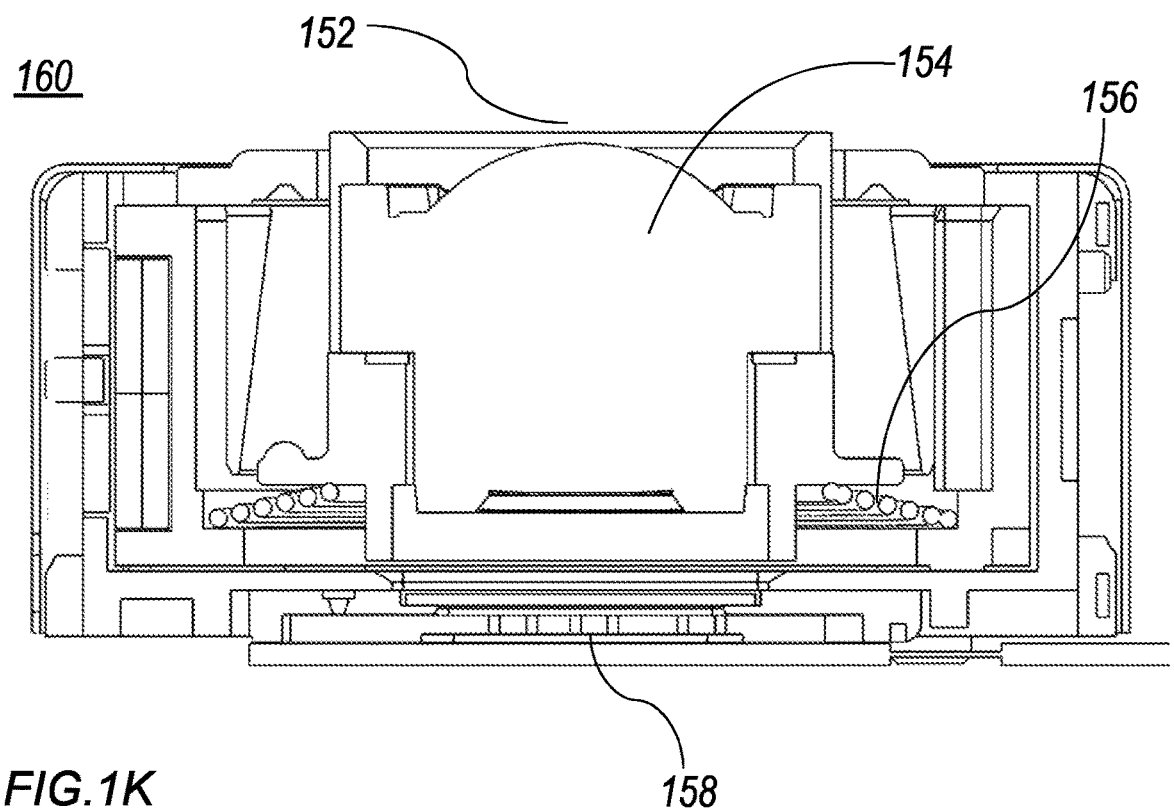
FIG. 1K shows the pop-out camera of FIG. 1J in a non-operational or "collapsed" state.

FIG. 1J-K shows exemplarily a pop-out Tele camera 160 which is described for example in co-owned international patent application PCT/IB2020/058697. FIG. 1J shows pop-out camera 160 in an operational or "pop-out" state. Pop-out camera 150 comprises an aperture 152, a lens barrel 154 including a lens (not shown), a pop-out mechanism 156 and an image sensor 158. FIG. 1K shows pop-out camera 160 in a non-operational or "collapsed" state. By means of pop-out mechanism 156, camera 150 is switched from a pop-out state to the collapsed state. In some dual-camera embodiments, both the W camera and the T camera may be pop-out cameras. In other embodiments, only one of the W or T cameras may be a pop-out camera, while the other (non-pop-out) camera may be a folded or a non-folded (upright) camera.

Figure 1L:
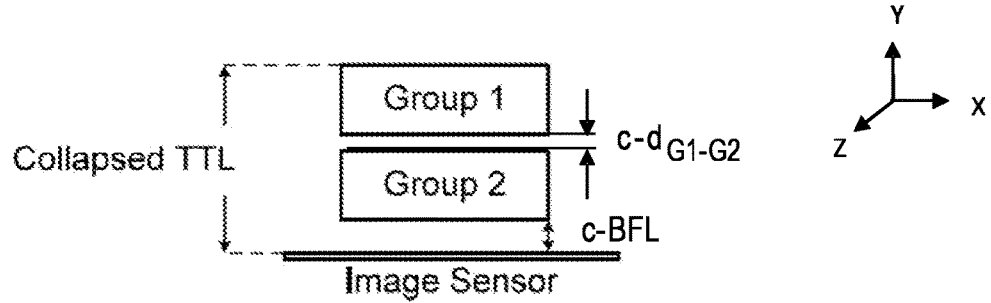
FIG. 1L shows an exemplary Tele-Macro camera lens system disclosed herein in a cross-sectional view in a collapsed state.

FIGS. 1L-O show schematically an exemplary pop-out Tele-Macro camera lens system 170 as disclosed herein in a cross-sectional view. Lens system 170 may be included in a pop-out camera as described in FIGS. 1J-K. FIG. 1L shows lens system 170 in a collapsed state.

Figure 1M:
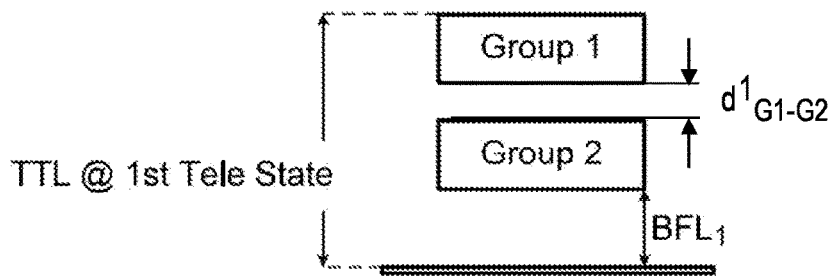
FIG. 1M shows the lens system of FIG. 1L in a first Tele state having a first EFL and a first zoom factor.
Figure 1N:
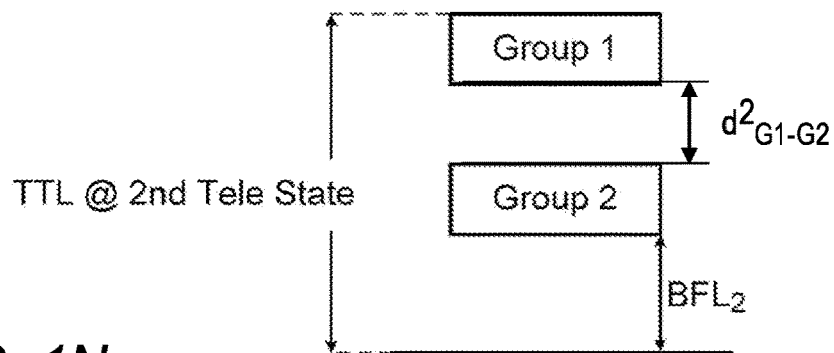
FIG. 1N shows the lens system of FIG. 1L in a second Tele state having a second EFL and a second zoom factor.
Figure 1O:
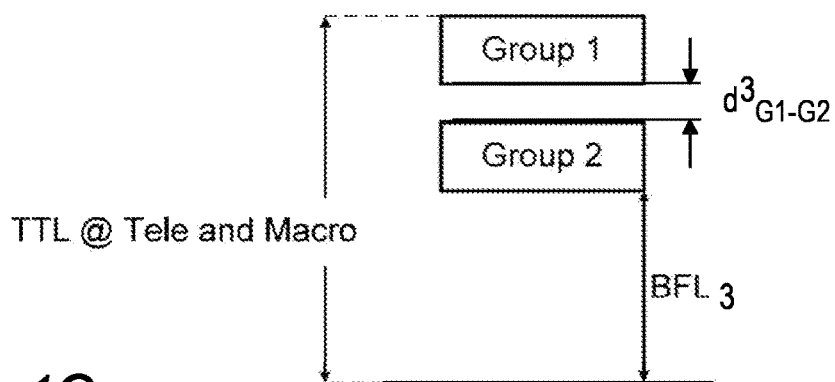
FIG. 1O shows the lens system of FIG. 1L in a Tele-Macro state having a third EFL and a third zoom factor.

FIG. 1M shows lens system 170 in a first Tele state having a first EFL (EFL1) and a first zoom factor (ZF1). FIG. 1N shows lens system 170 in a second Tele state having a second EFL (EFL2) and a second ZF2, wherein EFL1<EFL2 and ZF1<ZF2. FIG. 1O shows lens system 170 in a Tele-Macro state having a third EFL3 and a third ZF3. In the Tele-Macro state, a camera including lens system 170 can focus to close objects at <350 mm object-lens distance for capturing Macro images.

Figure 1P:
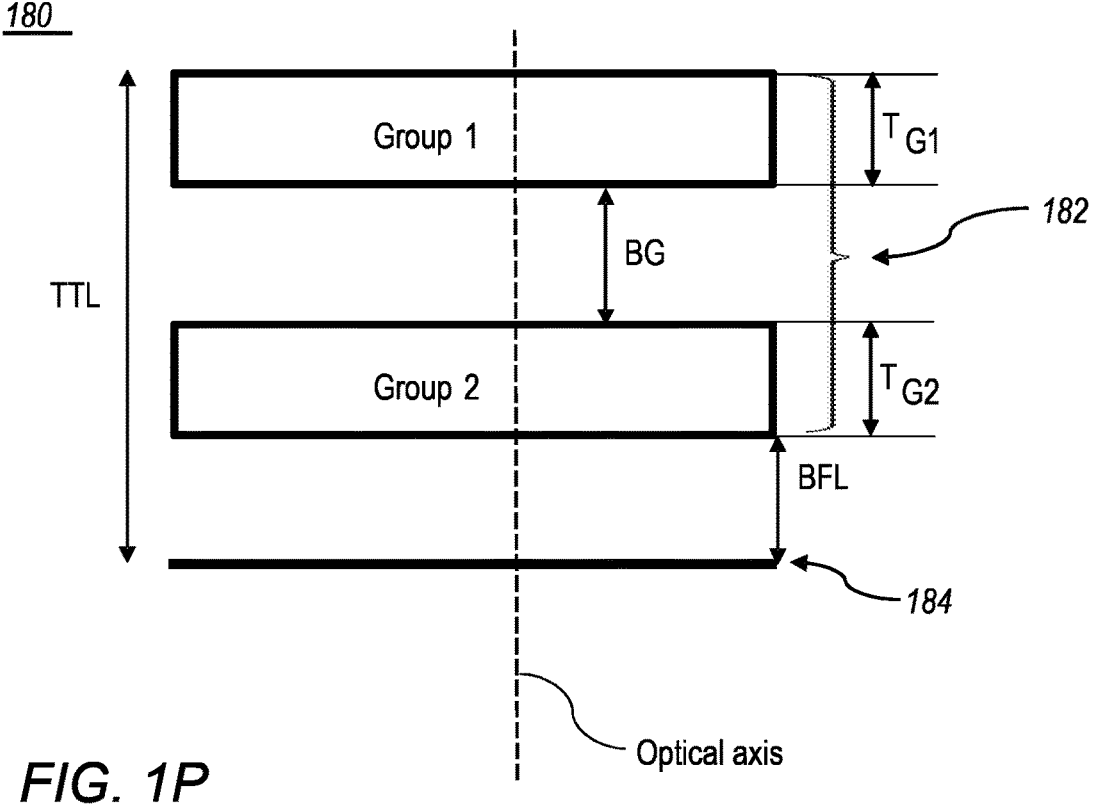
FIG. 1P shows schematically another exemplary Tele-Macro camera lens system disclosed herein in a cross-sectional view in pop-out state.
Figure 1Q:
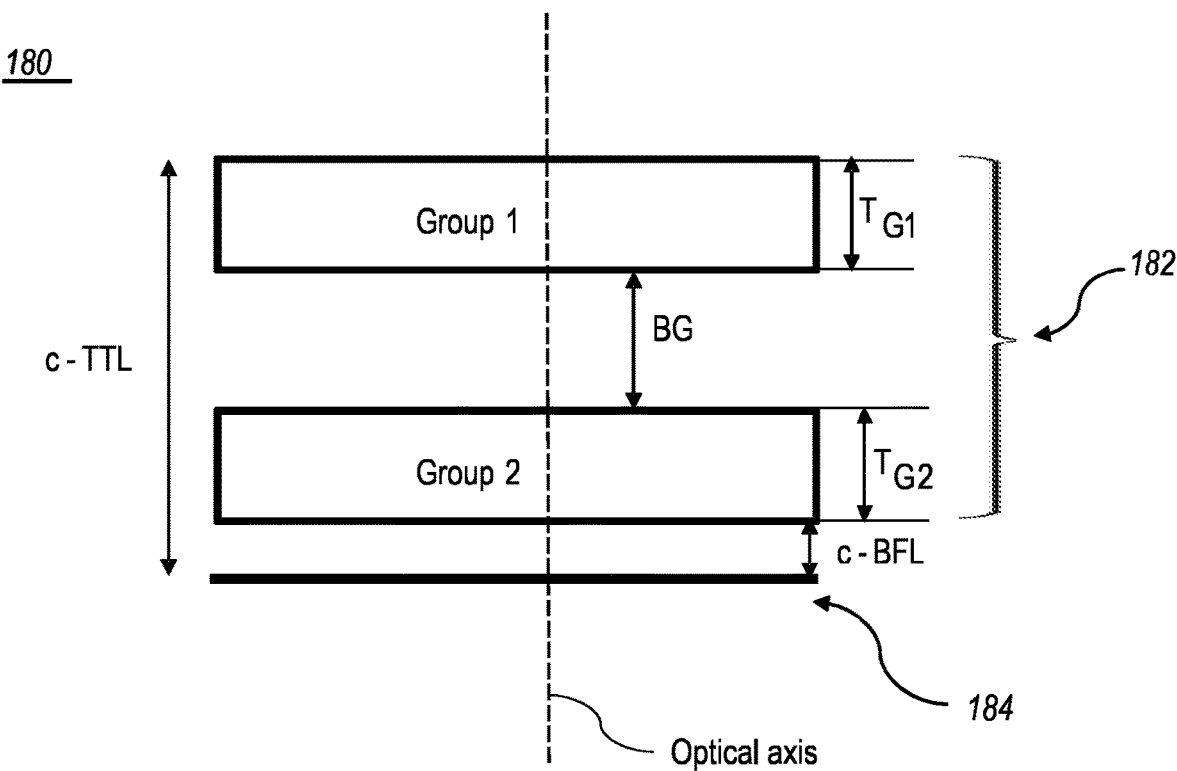
FIG. 1Q shows the lens system of FIG. 1P in a first collapsed state.
Figure 1R:
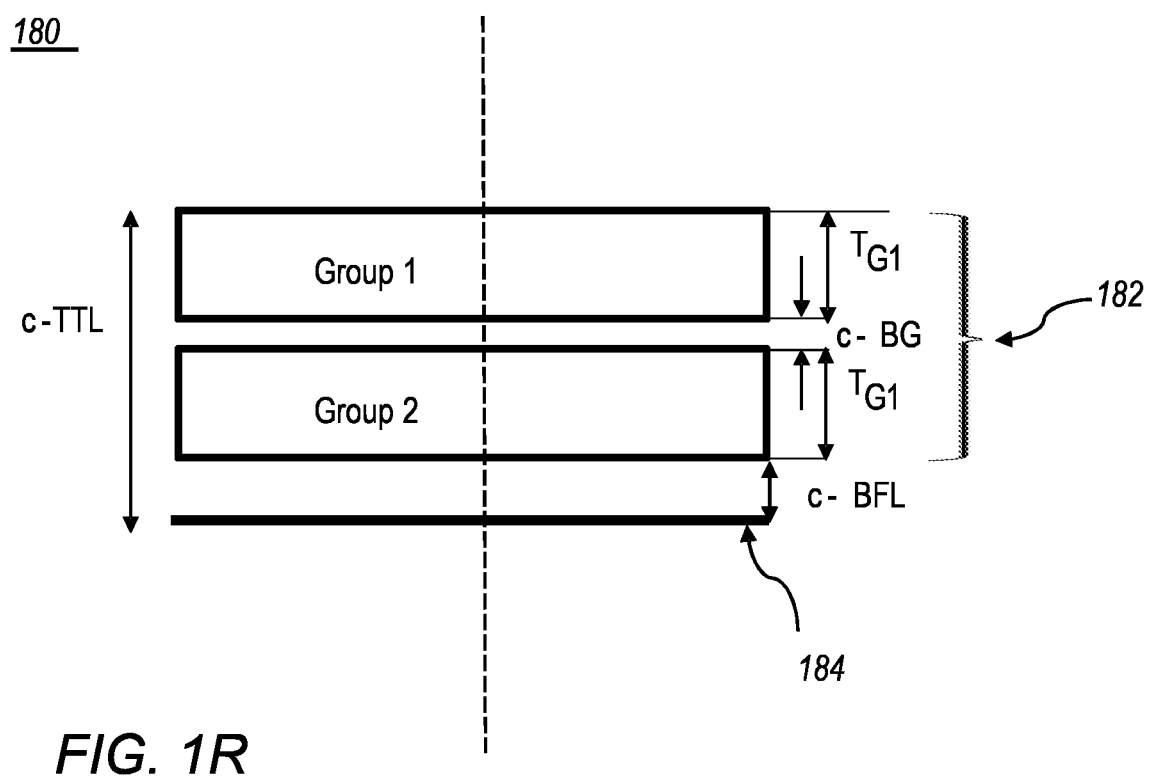
FIG. 1R shows the lens system of FIG. 1P in a second collapsed state.

FIGS. 1P-R show schematically another exemplary pop-out Tele-Macro camera lens system 180 as disclosed herein in a cross-sectional view. Lens system 180 includes a lens 182 and an image sensor 184. Lens system 180 may be included in a pop-out camera as described in FIGS. 1J-K. FIG. 1P shows lens system 180 in pop-out state. In a pop-out state, a camera including lens system 180 can focus to close objects at <350 mm object-lens distance for capturing Macro images. FIG. 1Q shows lens system 180 in a first collapsed state. FIG. 1R shows lens system 180 in a second collapsed state.

Figure 1S:
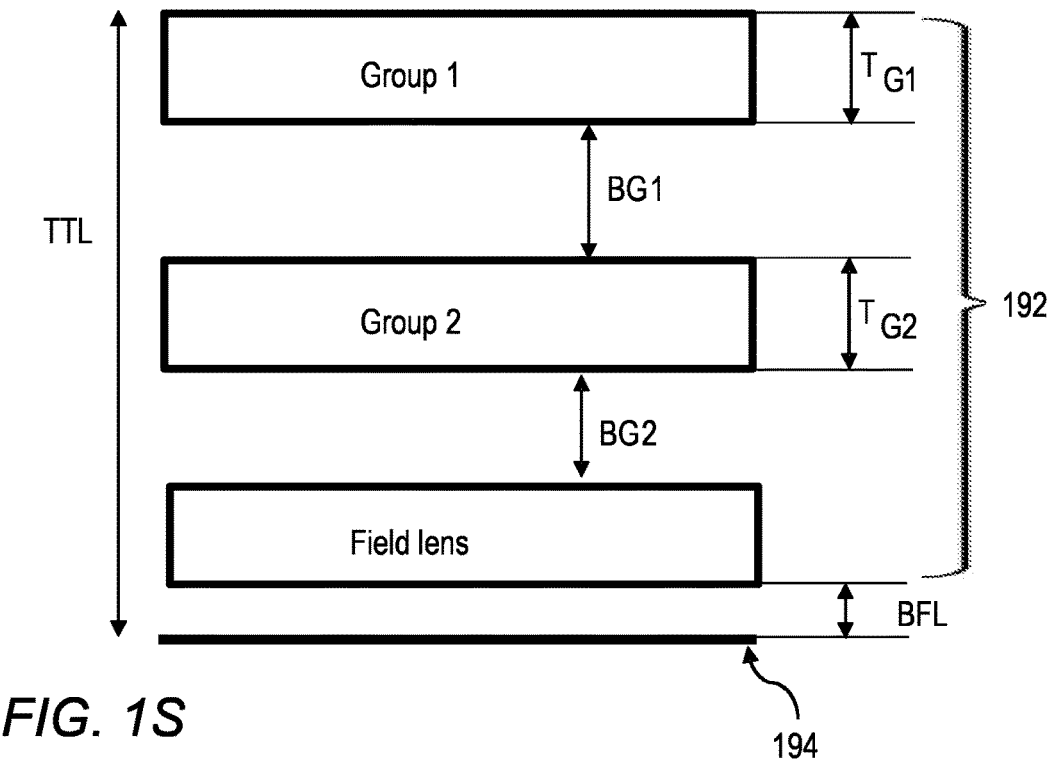
FIG. 1S shows schematically yet another exemplary Tele-Macro camera lens system disclosed herein in a cross-sectional view in pop-out state.
Figure 1T:
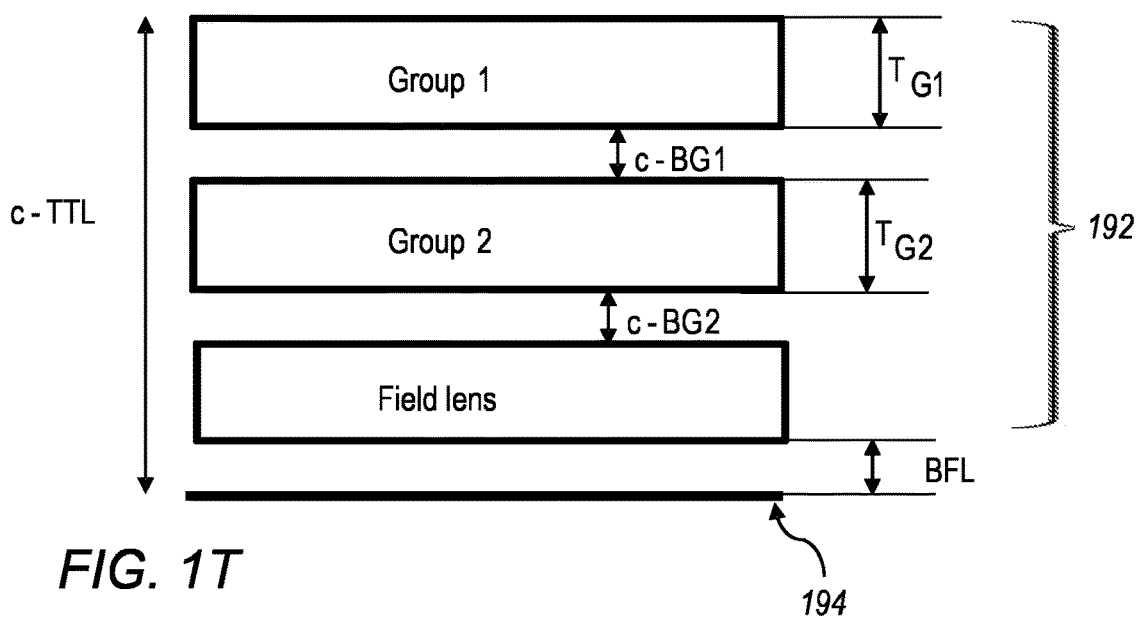
FIG. 1T shows the lens system of FIG. 1S in a collapsed state.

FIGS. 1S-T show schematically another exemplary pop-out Tele-Macro camera lens system 190 as disclosed herein in a cross-sectional view. Lens system 190 includes a lens 192 and an image sensor 194. Lens system 190 may be included in a pop-out camera as described in FIGS. 1J-K. FIG. 1S shows lens system 190 in pop-out state. In a pop-out state, a camera including lens system 190 can focus to close objects at less than 350 mm object-lens distance for capturing Macro images. FIG. 1T shows lens system 190 in a collapsed state.

Modules 100, 120, 130, 140, 150, 170, 180, 190 and 220 or cameras including modules 100, 120, 130, 140, 150, 170, 180, 190 and 220 may be able/used to capture Macro images with a Macro camera module such as Macro camera module 910.

Figure 1U:
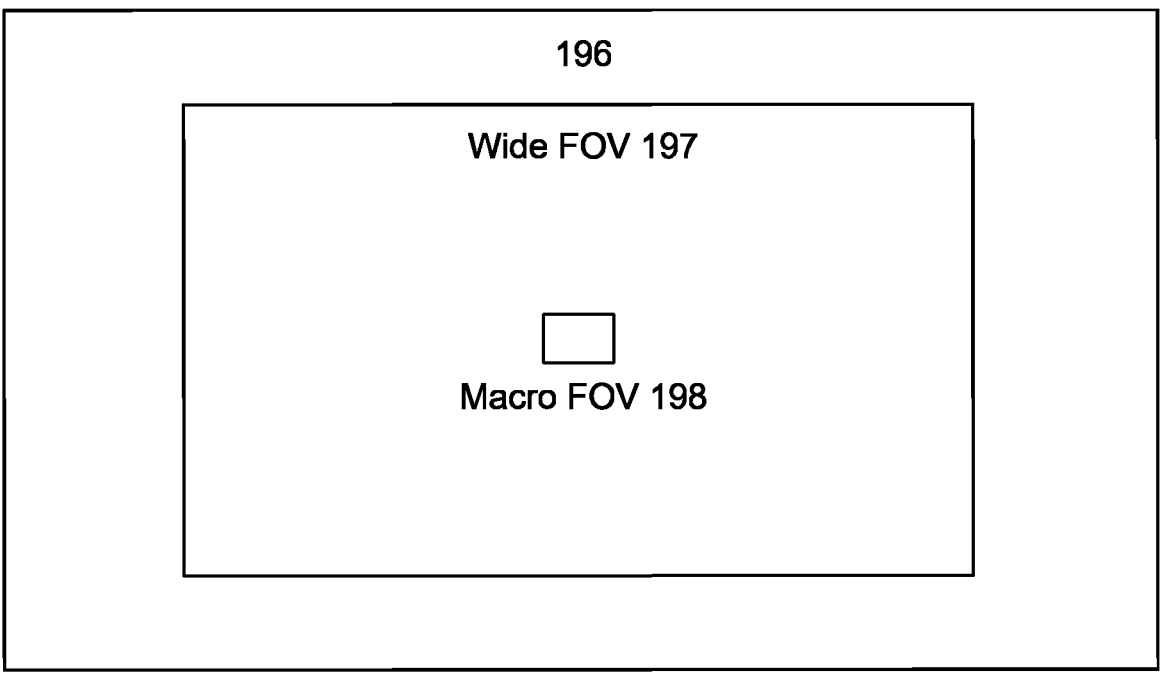
FIG. 1U shows schematically dual-camera output image sizes and ratios between an ultra-wide FOV and a Macro FOV.

FIG. 1U illustrates in an example 195 exemplary triple camera output image sizes of, and ratios between an Ultra-Wide (UW) FOV 196, a Wide (W) FOV 197 and a Macro FOV 198. With respect to a Tele camera used for capturing objects at lens-object distances of e.g. 1 m or more, in a Macro mode based on a Tele camera, a larger image is formed at the image sensor plane. Thus an image may cover an area larger than the active area of an image sensor so that only a cropped FOV of the Tele camera's FOV may be usable for capturing Macro images. As an example, consider a Macro camera that may have an EFL of 30 mm and an image sensor with 4 mm active image sensor width. When focused to an object at 5 cm (lens-object distance) a lens-image distance of v=77 mm is required for focusing and an object-to-image magnification of about 1:1.5 is achieved. A Macro FOV of about 43% of the actual Tele FOV may be usable for capturing Macro images.

The following description refers to W cameras, assuming that a UW camera could be used instead.

Figure 2A:
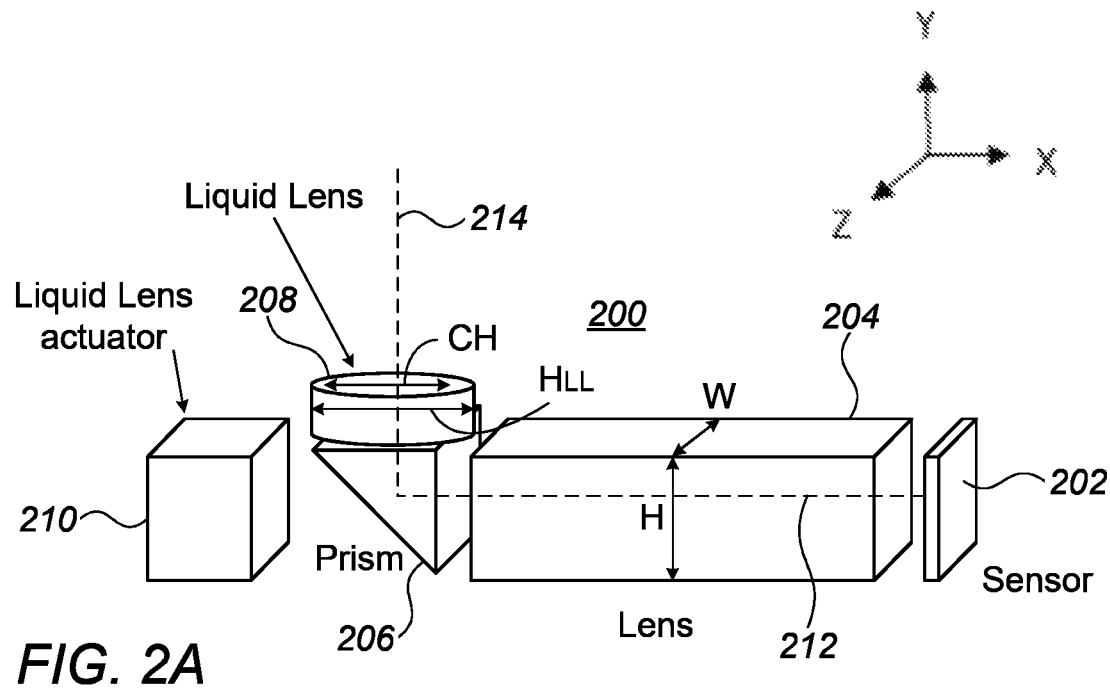
FIG. 2A illustrates an embodiment of a folded Tele digital camera with Macro capabilities disclosed herein.

FIG. 2A illustrates an embodiment of a folded Tele camera with Macro capabilities disclosed herein, numbered 200. Camera 200 comprises an image sensor 202, a lens 204 with an optical axis 212, and an OPFE 206, exemplarily a prism. Camera 200 further comprises a liquid lens (LL) 208 mounted on a top side (surface facing an object, which is not shown) of prism 206, in a direction 214 perpendicular to optical axis 212. The liquid lens has optical properties that can be adjusted by electrical voltage supplied by a LL actuator 210. In this embodiment, LL 208 may supply a dioptre range of 0 to 35 dioptre continuously. In a Macro photography state, the entire lens system comprising LL 208 and lens 204 may have an EFL of 7-40 mm. The DOF may be as shallow as 0.01-2 mm. In this and following embodiments, the liquid lens has a mechanical height $H_{LL}$ and an optical height (clear height) CH. CH defines a respective height of a clear aperture (CA), where CA defines the area of the lens surface that meets optical specifications. That is, CA is the effective optical area and CH is the effective height of the lens, see e.g. co-owned international patent application PCT/IB2018/050988.

For regular lenses with fixed optical properties (in contrast with a LL with adaptive optical properties), the ratio between the clear height and a lens mechanical height H (CH/H) is typically 0.9 or more. For a liquid lens, the CH/H ratio is typically 0.9 or less, e.g. 0.8 or 0.75. Because of this and in order to exploit the CH of the optical system comprising the prism and lens, $H_{LL}$ may be designed to be 15% larger or 20% larger than the smallest side of the prism top surface. In embodiment 200, LL actuator 210 is located along optical axis 212 of the lens, i.e. in the −X direction in the X-Y-Z coordinate system shown. Lens 204 may be a D cut lens with a lens width W that is larger than lens height H. In an example, a width/height W/H ratio of a D cut lens may be 1.2.

Figure 2B:
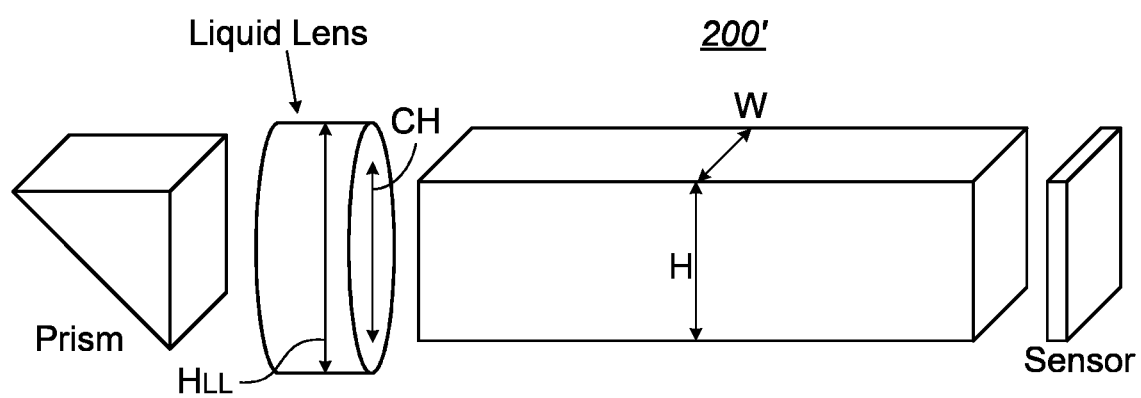
FIG. 2B illustrates another embodiment of a folded Tele digital camera with Macro capabilities disclosed herein.

FIG. 2B illustrates yet another embodiment of a folded Tele camera with Macro capabilities disclosed herein, numbered 200'. Camera 200' comprises the same elements as cameras 200, except that in in camera 200' LL 208 is located between prism 206 and lens 204. As in camera 200, lens 204 may be a D cut lens with a lens width W that is larger than a lens height H. In an example, a width/height W/H ratio of a D cut lens may be 1.2. As in camera 200, in a Macro photography state, the entire lens system comprising of LL 208 and lens 204 may have an EFL of 7 mm-40 mm and a DOF may be as shallow as 0.01-7.5 mm.

Figure 2C:
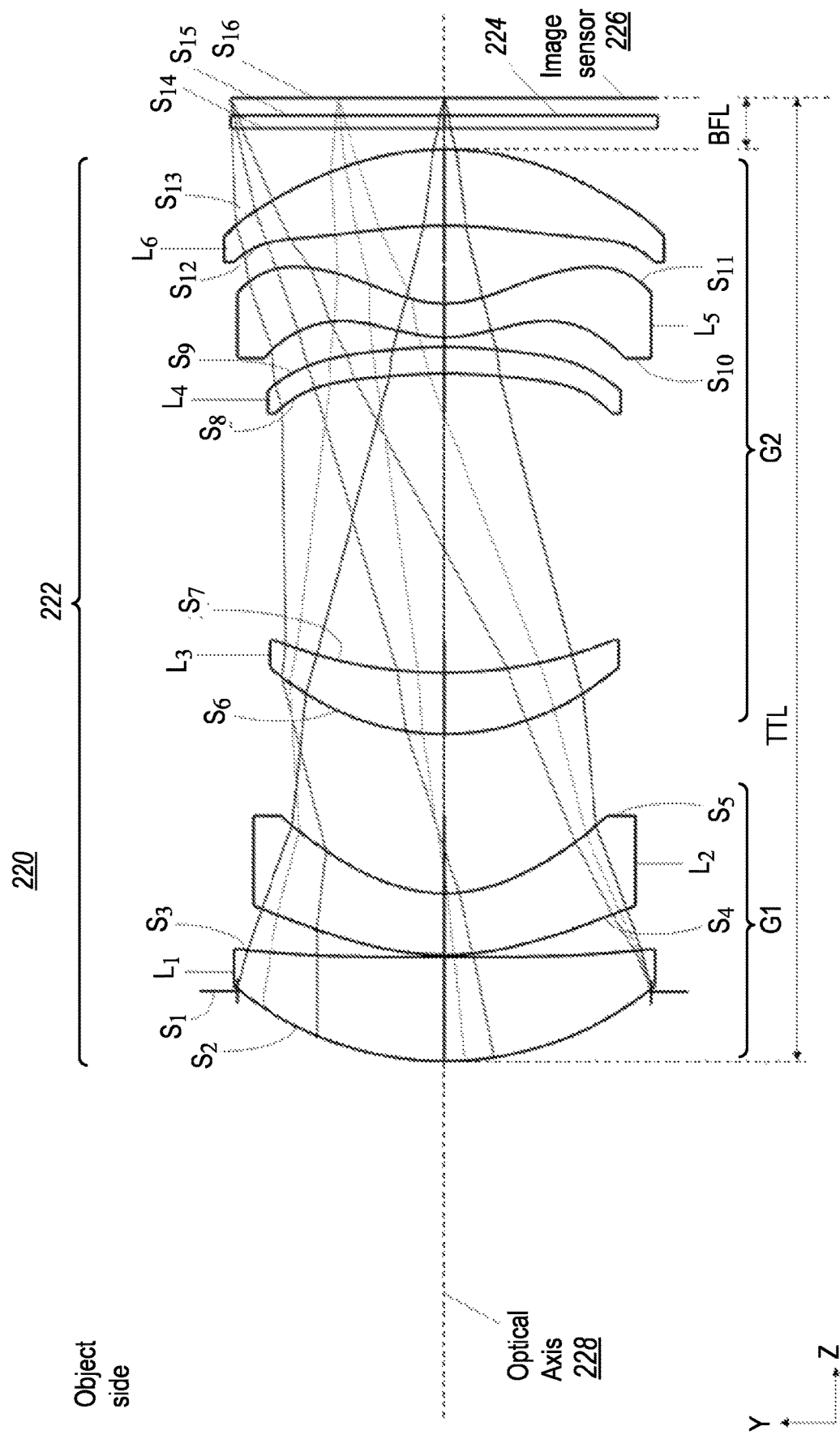
FIG. 2C shows in cross section yet another continuous zoom Tele lens and sensor module disclosed herein in a first zoom state.
Figure 2D:
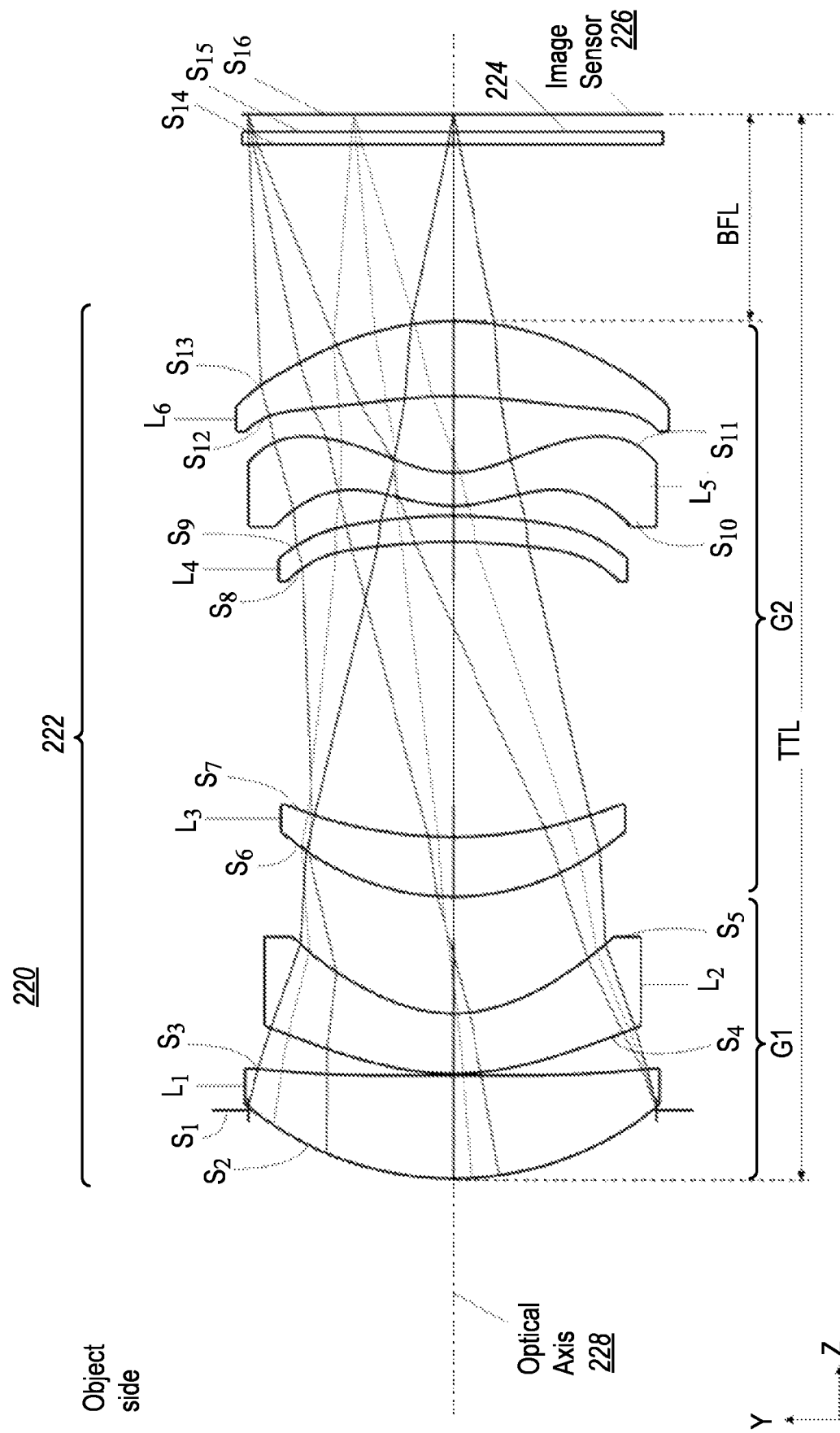
FIG. 2D shows the module of FIG. 2C in a second zoom state.
Figure 2E:
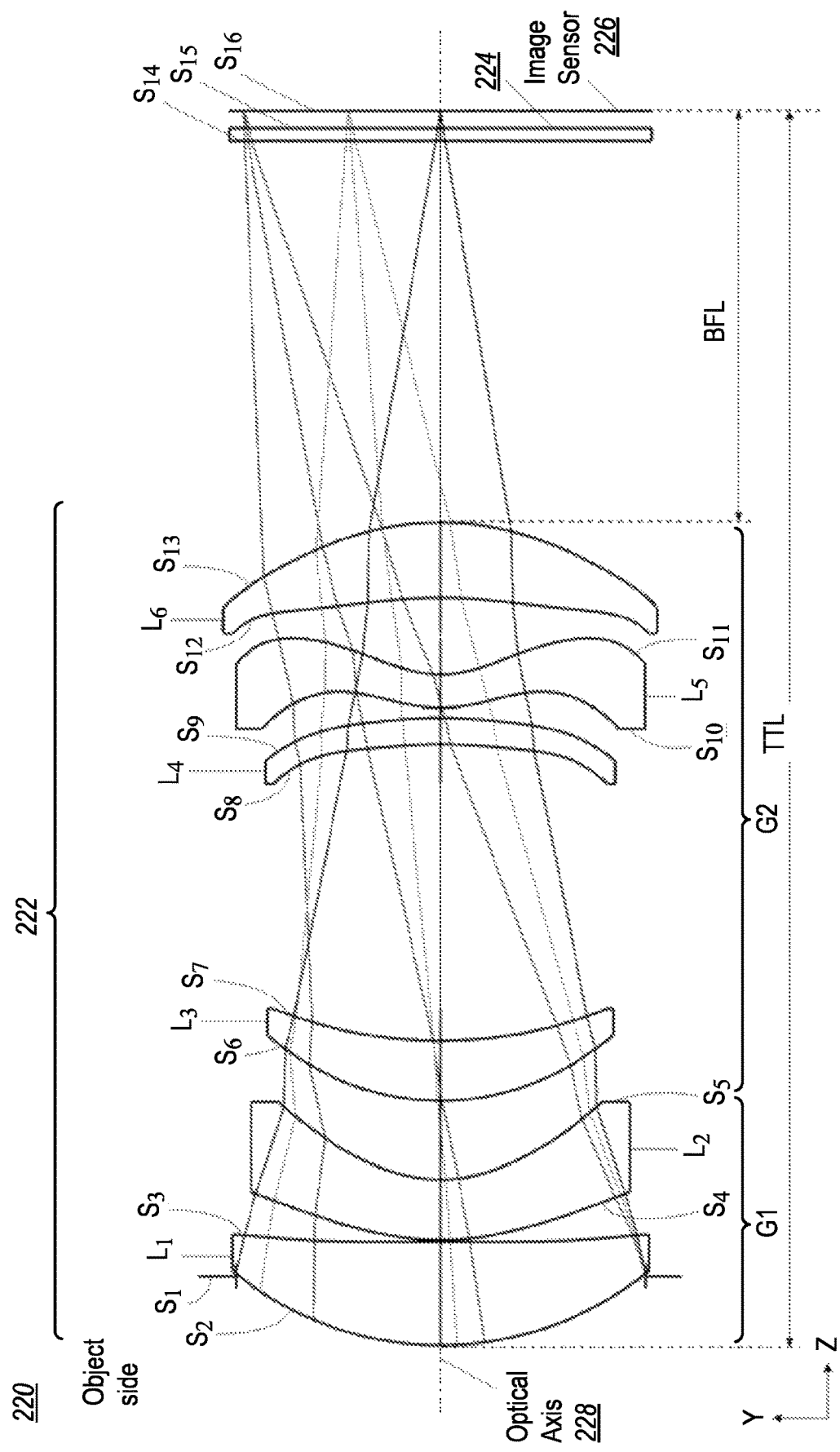
FIG. 2E shows the module of FIG. 2C in a third zoom state.

FIGS. 2C-2E show schematically another embodiment of a continuous zoom Tele lens and sensor module disclosed herein and numbered 220 in different zoom states. Module 220 is included in a folded Tele camera such as camera 1000. Module 220 comprises a lens 222, an (optional) optical element 224 and an image sensor 226. FIGS. 2C-2E show 3 fields with 3 rays for each: the upper marginal-ray, the lower marginal-ray and the chief-ray. Lens 222 includes 6 single lens elements L1-L6. The optical axis is indicated by 228.

FIG. 2C shows module 220 focused to infinity, FIG. 2D shows module 220 focused to 100 mm and FIG. 2E shows module 220 focused to 50 mm.

Lens 220 is divided into two lens groups G1 (includes lens elements $L_1$ and $L_2$) and G2 (includes $L_3$, $L_4$, $L_5$ and $L_6$) which move relative to each other and additionally together as one lens with respect to the image sensor for focusing. Because of the very shallow DOF that comes with these cameras, capturing a focus stack and building a good image out of it is not trivial. However, methods described below allow to do so.

Some multi-cameras are equipped with a W camera and a Tele camera with Macro capabilities both (or only one of the cameras) having a Phase-Detection Auto-Focus (PDAF) sensor such as a 2 PD sensor, i.e. a sensor in which each sensor pixel is divided into two or more sub-pixels and supports depth estimation via calculation of disparity. PDAF sensors take advantage of multiple micro-lenses ("ML"), or partially covered MLs to detect pixels in and out of focus. MLs are calibrated so that objects in focus are projected onto the sensor plane at the same location relative to the lens, see FIG. 3A.

Figure 3A:
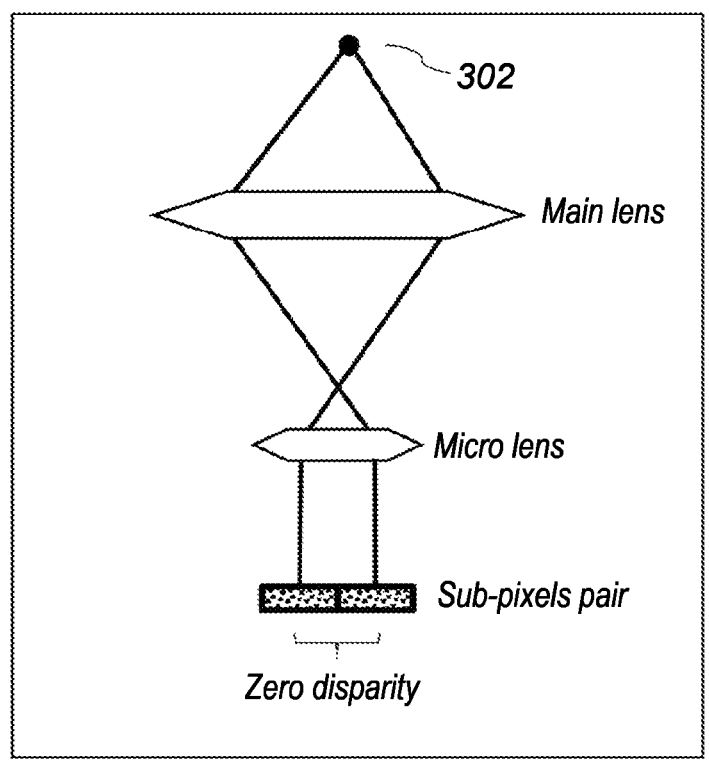
FIG. 3A shows a point object in focus, with a micro-lens projecting the light from the object onto the center of two sub-pixels, causing zero-disparity.
Figure 3B:
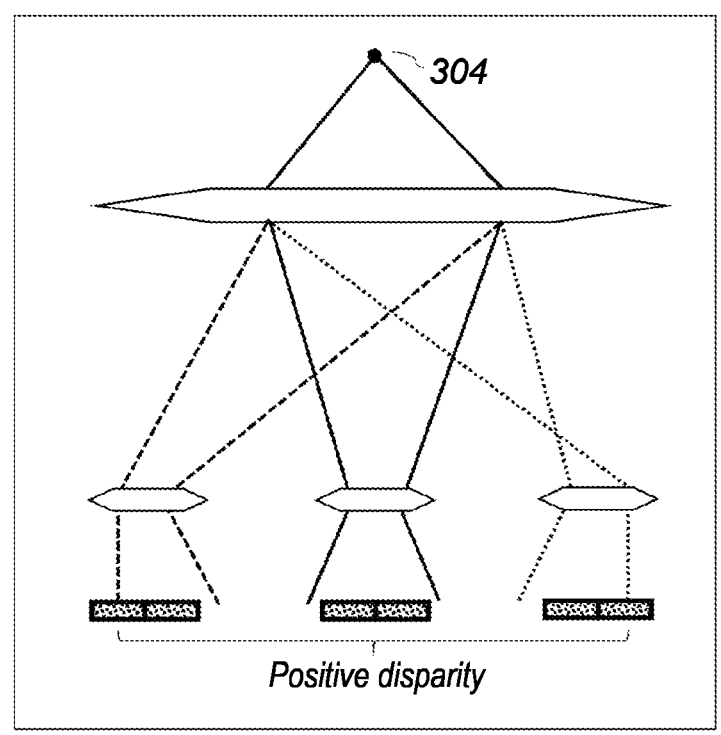
FIG. 3B shows light-rays from the point object in FIG. 3A out of focus.

FIG. 3A shows a point object 302 in focus, with a MLs projecting the light from the object onto the center of two sub-pixels, causing zero-disparity. FIG. 3B shows light-rays from a point object 304 out of focus. "Main-lens" "ML", and "Sub-pixels pair" are illustrated the same way in both FIGS. 3A and 3B. In FIG. 3B, a left ML projects the light from object 304 onto the center of a left sub-pixel. A right ML projects the same object onto a right sub-pixel, causing a positive disparity value of 2. Objects before/after the focal plane (not shown) are projected to different locations relative to each lens, creating a positive/negative disparity between the projections. The PDAF disparity information can be used to create a "PDAF depth map". Note that this PDAF depth map is both crude (due to a very small baseline) and relative to the focal plane. That is, zero-disparity is detected for objects in focus, rather than for objects at infinity. In other embodiments, a depth map may be crated based on image data from a stereo camera, a Time-of-Flight (ToF) or by methods known in the art for monocular depth such as e.g. depth from motion.

Figures 4A, 4B:
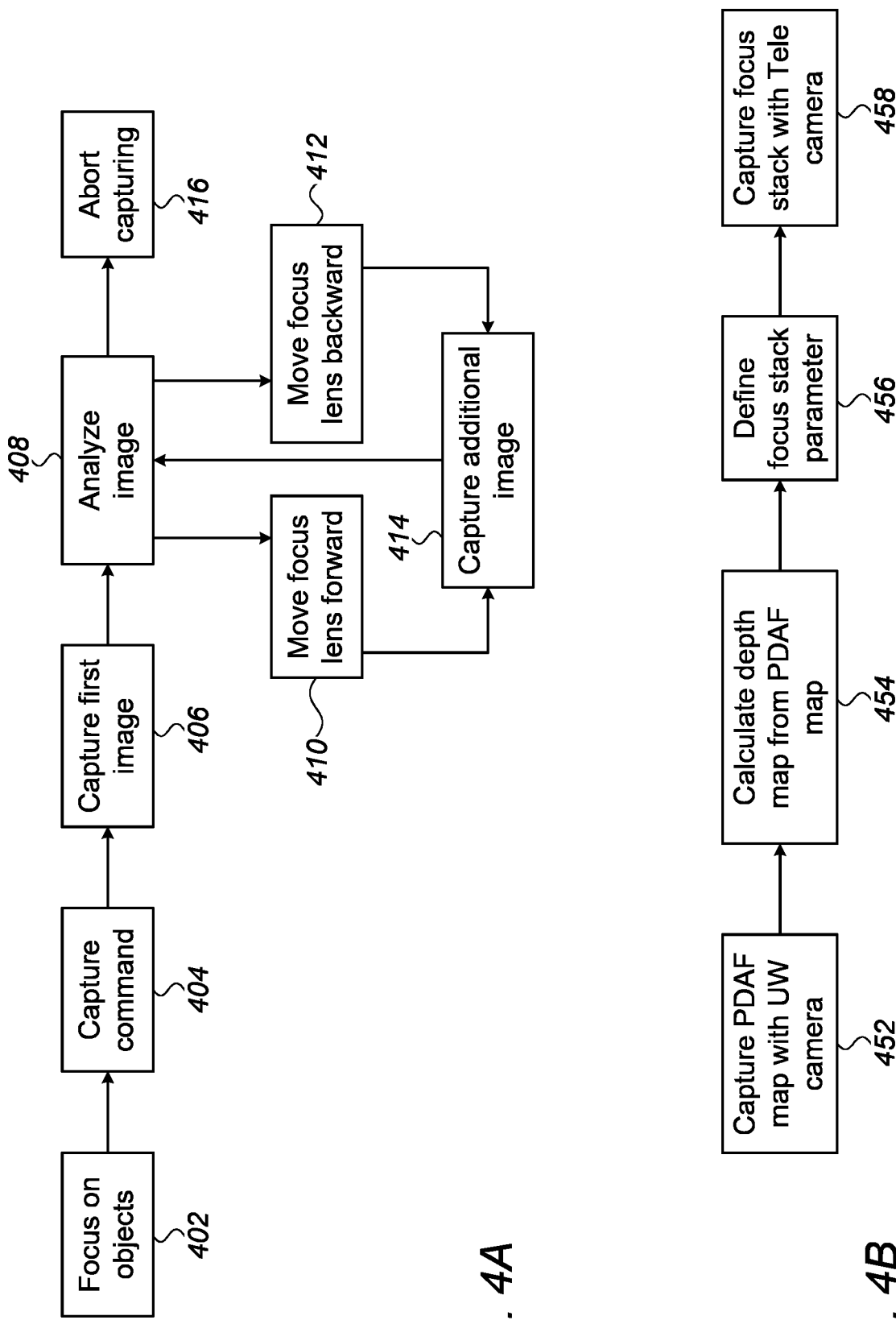
FIG. 4A illustrates a method of capturing a Macro focus stack disclosed herein.
FIG. 4B illustrates another method of generating a focus stack disclosed herein.

FIG. 4A illustrates a method of capturing a Macro focus stack (or "defining a Tele capture strategy") as disclosed herein. The term "focus stack" refers to a plurality of images that are captured in identical imaging conditions (i.e. camera and object are not moving during the capturing of the focus stack but the focus of the lens is moving in defined steps between consecutive image captures). An application controller (AP), for example AP 940 shown in FIG. 9, may be configured to perform the steps of this method. An object is brought into focus in step 402. In some embodiments and for bringing an object or region into focus, a focus peaking map as known in the art may be displayed to a user. If a scanning Tele camera such as camera 140 is used, an object may be brought into focus by detecting the object in the W camera FOV and automatically steering the scanning Tele camera FOV towards this object. An object in the W camera FOV may be selected for focusing automatically by an algorithm, or manually by a human user. For example, a saliency algorithm providing a saliency map as known in the art may be used for automatic object selection by an algorithm. The user gives a capture command in step 404. A first image is captured in the step 406. In step 408, the image is analysed according to methods described below and shown in FIG. 5A and FIG. 5B. In some embodiments, only segments of the image (instead of the entire image) may be analysed. The segments that are analysed may be defined by an object detection algorithm running on the image data from the Macro camera or on the image data of the W camera. Alternatively, the segments of the image that are analysed (i.e. OOIs) may be marked manually by a user. According to the results of this analysis, the lens is moved in defined steps for focusing forward (i.e. the focus moves a step away from the camera) in step 410, or for focusing backward (i.e. the focus moves a step towards the camera) in step 412. The forward or backward focus may depend on a command generated in step 408. A backward focusing command may, for example, be triggered when a plateau A (A') in FIG. 5B (or FIG. 5D) is detected. A forward focusing command may, for example, be triggered when no plateau A (A') in FIG. 5B (or FIG. 5D) is detected. An additional image is captured in step 414. These steps are repeated until the analysis in step 408 outputs a command for reversing the backward focusing or an abort command to abort focus stack capturing. An abort command may, for example, be triggered when a plateau A (A') or E (E') in FIG. 5B (or FIG. 5D) is detected. The abort command ends the focus stack capture in step 416. In another embodiment, step 410 may be replaced by step 412 and step 412 may be replaced by step 410, i.e. first the backward focusing may be performed and then the forward focusing may be performed.

If a scanning Tele camera such as camera 140 is used for capturing a Macro focus stack and defining a Tele capture strategy, an object that covers a FOV segment which is larger than the native Tele FOV ("object FOV") can be captured by multiple focus stacks that cover a different FOV segment of the object FOV each. For example, W camera image data may be used to divide the object FOV in a multitude of smaller (than the Tele $FOV_N$) FOVs with which are captured consecutively with the focus stack capture process as described above, and stitched together after capturing the multitude of FOVs.

If a continuous zoom Tele camera such as camera 120 or camera 130 is used for capturing a Macro focus stack and defining a Tele capture strategy, e.g. depending on the size or content or color of the object FOV, a specific zoom factor may be selected. For example, W camera image data can be used to analyze a Macro object. Based on this analysis, a suitable zoom factor for the continuous zoom Tele camera may be selected. A selection criterion may be that the FOV of the continuous zoom Tele camera fully covers the Macro object. Other selection criteria may be that the FOV of the continuous zoom Tele camera not just fully covers the Macro object, but covers additionally a certain amount of background FOV, e.g. for aesthetic reasons. Yet other selection criteria may be to select a FOV so that the images captured by the continuous zoom Tele camera may have a certain DOF. As a first example, a larger DOF may be beneficial for capturing an object with a focus stack including a smaller number of single images. As a second example, a specific DOF may be beneficial, e.g. as of the Macro image's aesthetic appearance.

FIG. 4B illustrates another method of capturing a focus stack (or defining a Tele capture strategy). An AP (e.g. AP 940 shown in FIG. 9) may be configured to perform the steps of this method. In step 452, a PDAF map is captured with the W camera. In step 454, a depth map is calculated from the PDAF map as known in the art. Focus stack parameters such as focus step size and focus stack brackets are derived in step 456 from the depth map. The focus stack brackets are the upper and lower limits of the focus stack, i.e. they include two planes, a first in-focus plane with the largest object-lens distance in the focus stack, and a second in-focus plane with the smallest object-lens distance in the focus stack. A plurality of images with shifted focus is captured between these two limits. The focus step size defines the distance between two consecutive in-focus planes that were captured in the focus stack. A focus plane may have a specific depth defined by the DOF (focus plane located in center). The parameters defined in step 456 may be used to control the camera. For example, the parameters may be fed into a standard Burst mode feature for focus stack capture, as supplied for example on Android smartphones. In step 458, the focus stack is captured according to the parameters. In other embodiments, the PDAF map in step 452 may be captured not by a W camera, but by a Macro capable Tele camera. The PDAF map of the Tele camera may exhibit a higher spatial resolution, which may be desirable, and a stronger blurring of out-of-focus areas, which may be desirable or not. The stronger blurring of out-of-focus areas may be desirable for an object having a shallow depth, e.g. a depth of <1 mm. The stronger blurring of out-of-focus areas may not be desirable for an object having a larger depth, e.g. a depth of >2.5 mm. A strong blurring may render a depth calculation as performed in step 454 impossible.

In some embodiments, in step 452, PDAF image data may be captured from specific scene segments only, e.g. for a ROI only. In other embodiments, in step 452, PDAF image data may be captured from the entire scene, but depth map calculation in step 454, may be performed for segments only. The specific scene segments may be identified by image analysis performed on image data from a UW or a W or the Tele camera. PDAF maps may be captured in step 452 not only from single images, but also from a video stream.

In some embodiments, instead of calculating a depth map in step 454, a depth map or image data for calculating a depth map may be provided by an additional camera.

In some embodiments, a different analysis method may be applied in order to analyse the entire Macro scene at only one (or only a few) focus position(s). From this analysis, a preferred focus stack step size and focus stack range may be derived. These values are then feed into a standard Burst mode feature for focus stack capture.

In some embodiments, for focus stack capture in step 458, imaging settings such as the values for white-balance and exposure time may be kept constant for all images captured in the focus stack.

Capturing a focus stack comprising Macro images with shallow DOF may require actuation of the camera's lens with high accuracy, as the DOF defines a minimum accuracy limit for the focusing process. The requirements for actuation accuracy may be derived from the images' DOF. For example, an actuation accuracy may be required that allows for controlling the location of the focus plane with an accuracy that is larger than the DOF by a factor of 2-15. As an example, consider a focus stack including Macro images having a DOF of 50 µm, i.e. segments of the scene that are located less than 25 µm distance from the focus plane are in-focus. The minimum accuracy for focusing would accordingly be 25 µm-3 µm.

Optical image stabilization (OIS) as known in the art may be used during focus stack capturing. OIS may be based on actuating the lens or the image sensor or the OPFE of camera 910. In some embodiments, depth data of the Macro scene may be used for OIS.

Figure 5A:
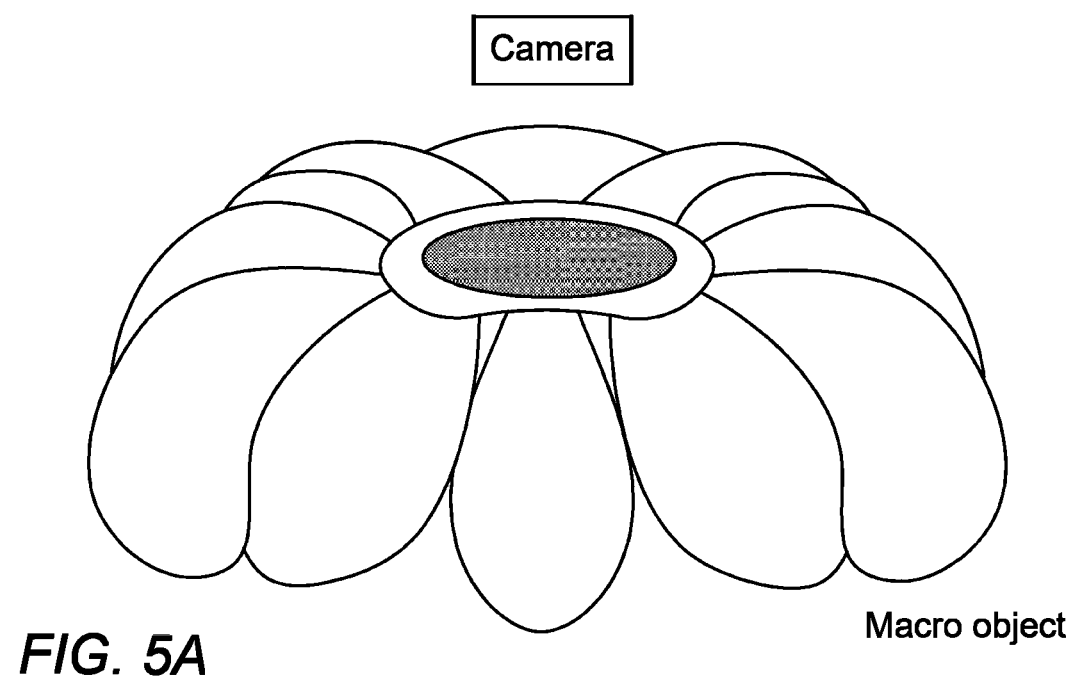
FIG. 5A shows an exemplary Macro object and setup for capturing the Macro object.

FIG. 5A shows exemplarily a Macro object (here Flower) and a camera for capturing the Macro object (not in scale). The flower is captured from a top position (marked by "camera").

Figure 5B:
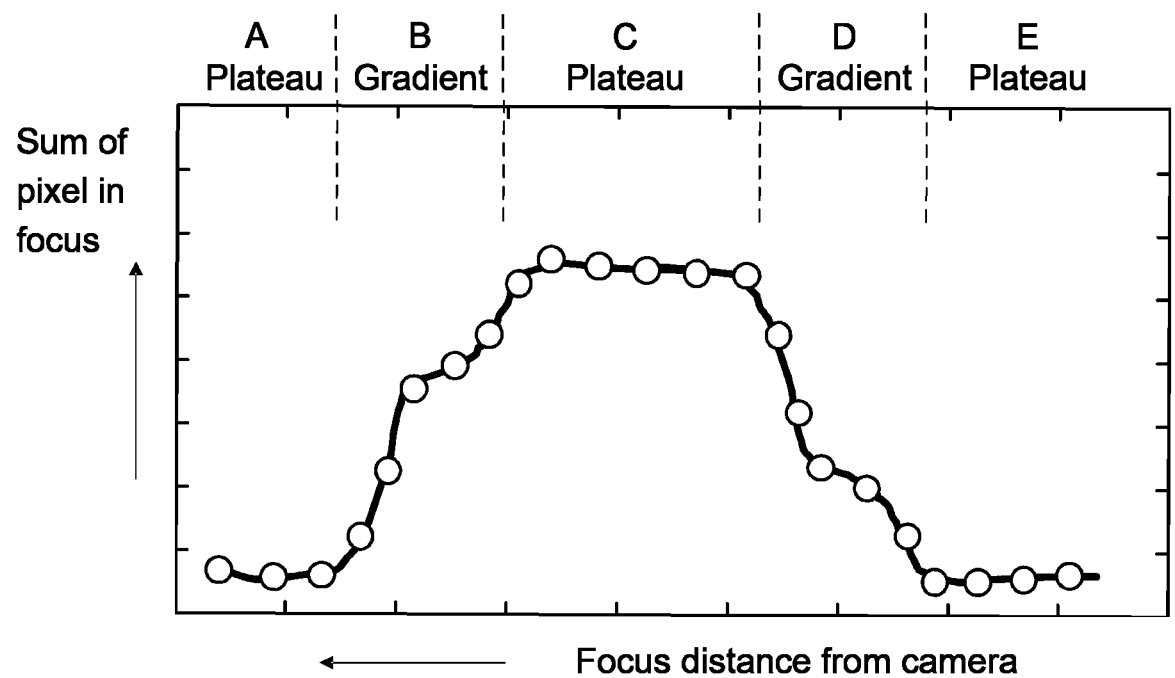
FIG. 5B shows an output graph for the Macro setup of FIG. 5A.

FIG. 5B shows an exemplary output graph for the Macro setup of FIG. 5A obtained using a method described in FIG. 4A. The dots in the graph represent the results of the analysis for a specific image of the focus stack, i.e. each image in the focus stack is analysed during focus stack capturing as described above, where the analysis provides a number (sum of pixels in focus) for each image. These numbers may be plotted as illustrated here. The analysis may use functions as known in the art such as e.g. Laplacian of Gaussians, or Brenner's focus measure. An overview of suitable functions may be found in Santos et al., "Evaluation of autofocus functions in molecular cytogenetic analysis", 1997, Journal of Microscopy, Vol. 188, Pt 3, December 1997, pp. 264-272.

The analysis output is a measure for the amount of pixels in each image that are in-focus. The larger the number output for a specific image, the higher the overall number of pixels in the image that are in focus. The assumption of the focus stack analysis is that a major part of Macro objects exhibits an analysis curve characterized by common specific features. The curve is characterized (starting from a left image side, i.e. from a camera-scene setup where the focus is farther away than the Macro object) by a plateau A (focus farther away than object, so almost no pixel is in-focus and there is a small output number), followed by a positive gradient area B (where first the farthest parts of the Macro objects are in-focus and then larger parts of the Macro object are in-focus), followed by a plateau C (where for example the center of the Macro object and large parts of the object are in-focus), which is followed by a negative gradient D (where the focus moves away from Macro object center), followed by a plateau E. The abort command as described in FIG. 4A is triggered by detecting plateau A or plateau E. Depending on which focus position the focus stack capture was started, the focus stack capture will be aborted or the direction of focus shifting will be switched (from towards the camera to away from the camera or the other way around). In general, focus stack capture may be started with a focus position where a part or point of the Macro object is in focus. The analysis will output a high number for the first image. Then focus is moved away from the camera, which means that analysis output moves on the plateau C (towards the left in the graph), until it reaches the gradient area B in the graph and in the end the plateau area A. If there is no further increase in the number outputted from the analysis, the focus is moved back to the first position (at plateau C) and focus is shifted towards the camera. The same steps as described above are performed till in the end plateau E is reached. Here the focus stack capture process is finished.

Figure 5C:
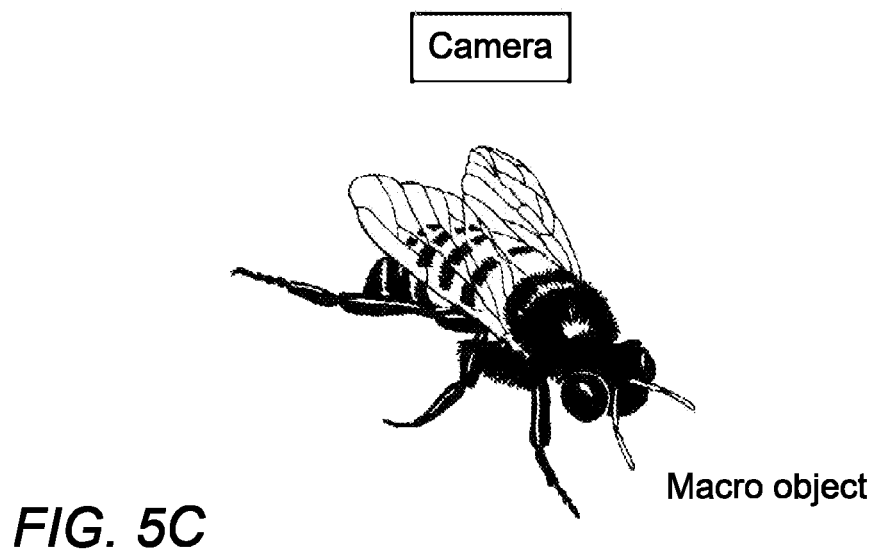
FIG. 5C shows another exemplary Macro object and setup for capturing the Macro object.
Figure 5D:
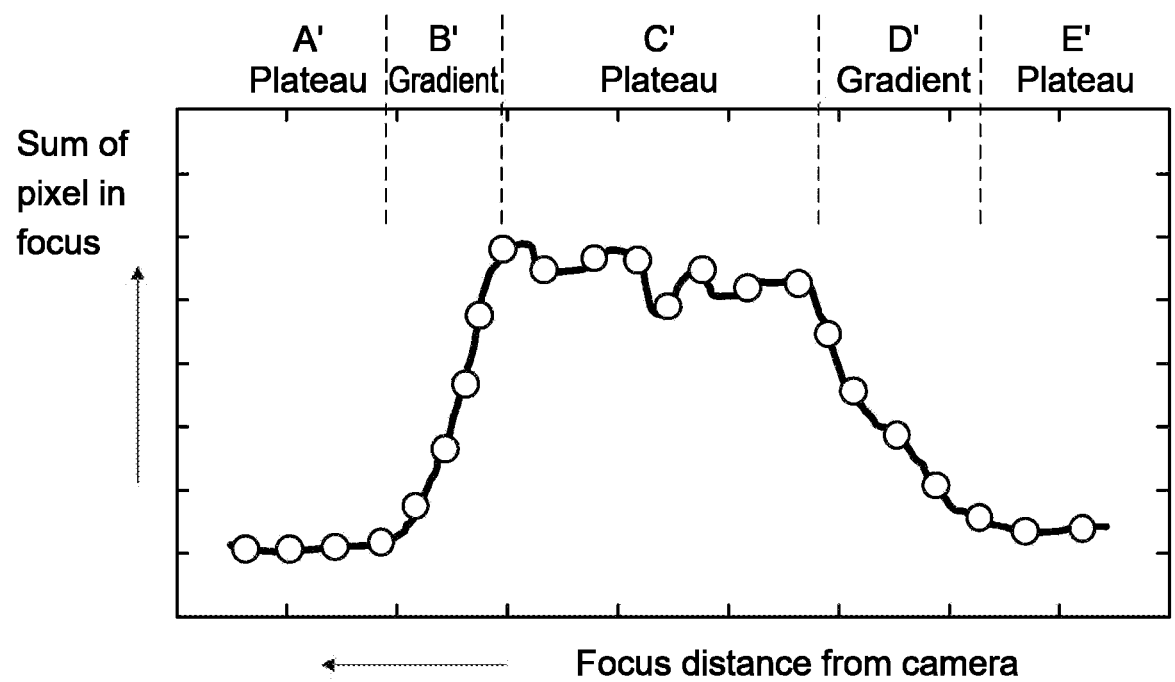
FIG. 5D shows an output graph for the Macro setup of FIG. 5C.

FIG. 5C shows another exemplary Macro object (here a bee) and another camera for capturing the Macro object (not in scale). FIG. 5D shows another exemplary output graph for the Macro setup of FIG. 5C using a method described in FIG. 4. Although varying in details because of the different object depth distribution, features A'-E' here are similar to features A-E in FIG. 5B.

Figure 6:
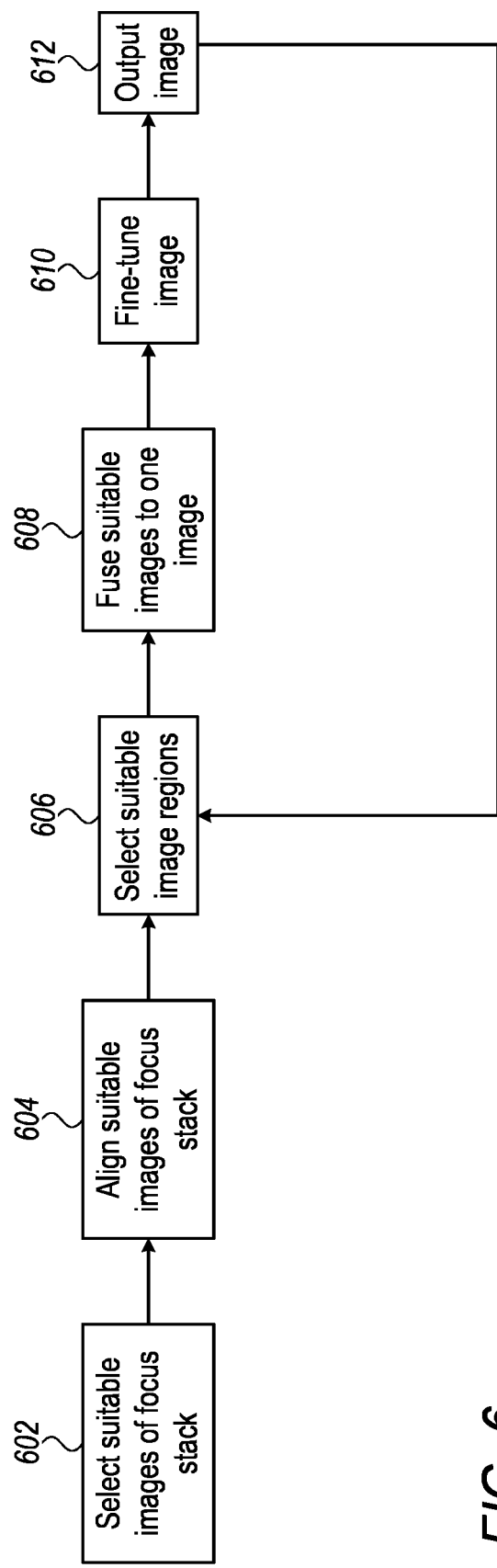
FIG. 6 illustrates a method of generating single Macro images from a plurality of images of a focus stack.

The Tele images of the focus stack captured according to methods described e.g. in FIG. 4A, FIG. 4B and FIG. 5A-D are the input Macro images that may be further processed, e.g. by the method described in FIG. 6.

FIG. 6 illustrates a method of generating single Macro images from a plurality of images of a focus stack. An AP such as AP 940 may be configured to perform the steps of this method. Suitable images of the focus stack are selected by analysis methods known in the art in step 602. Criteria that may disqualify an image as "suitable" image may include: significant motion blur (e.g. from handshake) in an image, redundancy in captured data, or bad focus. Only selected suitable images are used further in the process. The suitable images are aligned with methods as known in the art in step 604. Suitable image regions in the aligned images are selected in step 606. Selection criteria for "suitable" regions may include the degree of focus of an area, e.g. whether an area is in focus or has a certain degree of defocus blur. The choice of selection criteria depends on the input of a user or program. A user may wish an output image with a Macro object that is all-in-focus (i.e. image with a depth of field larger than the depth of the Macro object), meaning that all the parts of the Macro object are in focus simultaneously. However, the all-in-focus view generally does not represent the most pleasant image for a human observer (as human perception comes with certain amount of blurring by depth, too), so an image with a certain focus plane and a certain amount of blurred area may be more appealing. "Focus plane" is the plane formed by all points of an un-processed image that are in focus. Images from a focus stack generated as described in FIG. 4A-B and a selection of suitable images in step 606 may allow to choose any focus plane and any amount of blurring in the output image 612 continuously. The amount of blurring of image segments that are not in focus may depend on their location in a scene. The amount of blurring may be different for image segments of object segments that are further away from the camera by some distance d with respect to the focus plane, than for image segments that are closer to the camera than the focus plane by the same distance d. The continuous control of the focus plane's position and the depth of field of the new Macro image may be performed after capturing the focus stack ("post-capture"). In some embodiments, continuous control of the focus plane's position and the depth of field of the new Macro image may be performed before capturing the focus stack ("pre-capture") as well and e.g. enabled by showing a preview video stream to a user. The selected images are fused into a single image with methods known in the art in step 608. In some embodiments and optionally, the fusion in step 608 may use depth map information, estimated e.g. using depth from focus or depth from defocus methods known in the art. In other embodiments, depth map information from PDAF (see FIG. 3A-B) may be used. The PDAF information may be provided from the image sensor of the UW camera or from the W camera or from the Tele camera with Macro capability. In some embodiments, PDAF data may be captured by the Tele camera simultaneously with capturing the Tele focus stack images, i.e. a stack of PDAF images is captured under identical focus conditions as the focus stack image. From this PDAF image stack a depth map may be calculated. E.g. one may use in-focus image segments from a single PDAF image only, as they can be assigned to a specific depth with high accuracy. By fusing the depth estimation data from all the in-focus image segments of the PDAF image stack a high-quality depth map may be generated.

In some embodiments, both Tele image data and Wide image data may be fused to one image in step 608.

In other embodiments, only a subset of the images selected in step 602 may be fused into a single image in step 608 and output in step 612. For example, a subset of only 1, only 2, or only 3, or only 4, or only 5 images may be fused into one single image in step 608 and output in step 612. In yet another embodiment, only one of the images selected in step 602 may be output in step 612. The single output image is fine-tuned in step 610 to finalize results by, e.g. reduce noise. The fine tuning may include smoothening images seams, enhancements, filters like radial blur, chroma fading, etc. The image is output in step 612.

In other embodiments, selection of suitable image regions in step 606 may be based on an image analysis performed on images from a W camera. Because of the wider FOV and larger DOF of a W camera (with respect to a Macro capable Tele camera), it may be beneficial to additionally use W image data for generating the single Macro images, e.g. for object identification and segmentation. For example, a Macro region of interest (ROI) or object of interest (OOI) may be detected in $FOV_W$ before or during focus stack capturing with the Macro capable Tele camera. The ROI or OOI may be segmented according to methods known in the art. Segmentation means identification of coordinates of the FOV segment that contains the ROI or OOI. Via calibration of the $FOV_W$ and $FOV_T$, these coordinates are translated to the $FOV_T$ coordinates. The coordinates of ROIs or OOIs may be used for selection of suitable image regions in step 606. In some embodiments, the segmentation analysis may be performed on single images. In other embodiments, the segmentation analysis may be performed on a video stream, i.e. on a sequence of single images.

In some embodiments, image information of the W camera may be used for further tasks. One or more W images may be used as a ground truth "anchor" or reference image in the Macro image generation process. Ground truth refers here to W image information about a scene segment that is significantly more complete than the Tele image information of the same scene segment. A single W image provides significantly more information about a Macro object than a single Tele image. As an example one may think of an ROI or OOI that is mostly in-focus and fully visible in a single W image but only partly visible in a single Tele image, e.g. because of the significantly shallower Tele DOF. The W ground truth or reference image may be used as ground truth anchor in the following steps of the method described in FIG. 6:

In step 602, a W image may be used for selection of suitable images. The ground truth may e.g. allow to identify Tele images that exceed a certain threshold of focus blur or motion blur.

In step 604, a W image may be used as a reference image for aligning images. In one example the Tele images of the focus stack may all be aligned with reference to the W reference image. In another example, the Tele images of the focus stack may first all be aligned with reference to the W reference image, and for more detailed alignment the Tele images may be aligned with reference to other Tele images of the focus stack.

In step 606, a W image may be used for defining suitable image regions as described above.

In step 608, a W image may be used for correction of fusion artifacts. Fusion artifacts are defined as visual features that are not present in the actual scene but that are an undesired byproduct of the image fusion process.

In step 610, a W image may be used to identify image segments in the fused image that exhibit undesired features and that may be corrected. Such undesired features may e.g. be misalignments of images, unnatural color differences or blurring caused by e.g. de-focus or motion. De-focus blur may e.g. be induced by estimation errors in the depth map used in image fusion step 608.

Figure 7:
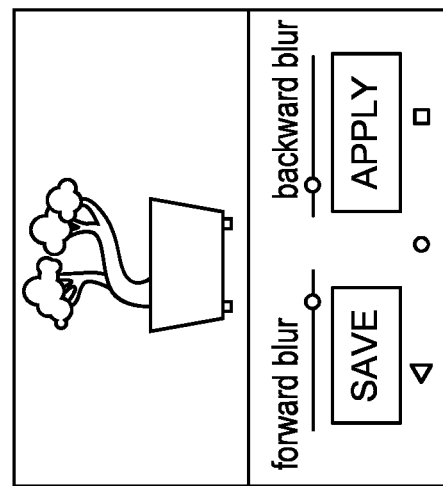
FIG. 7 shows a graphic user interface (GUI) that a user may use to transmit a command to modify the appearance of the output image.

In yet another embodiment, the method described above may not involve any image processing such as described in steps 608-612, but may be used to select a single image from the focus stack. The selection may be performed automatically (e.g. by analyzing the focus stack for the sharpest, most clear and well-composed image with a method as described in FIG. 5A-5D) or manually by a human user. FIG. 7 shows a graphical user interface (GUI) that a user may use to transmit a command to modify the appearance of the output image, e.g. a user may transmit a command (e.g. "forward blur" and "backward blur") for a more blurred image or an image where larger parts are in focus. "Background blur" and "forward blur" refer to the blur options as described in FIGS. 8A, 8B. In one embodiment, in case the user command is to modify the appearance of an image, the method will be re-performed from step 606 on, however with a different set of selection criteria. In another embodiment, in case the user command is to modify the appearance of an image, a blurring algorithm (artificial blurring) may be applied to the output image to form another output image. The focus plane may be changed by marking a new image segment that should be in-focus by touching the device screen. The blur may be changed according to the wishes of the user. The user may wish to modify the DOF of the displayed image, e.g. from an all-in-focus image (i.e. infinite DOF) to a more shallow DOF. A user may wish to modify the focus plane of an image that is not all-in-focus. A user may modify the image, and a pre-view image generated by an estimation indicating a projected output image may be displayed. If a user performs a click on "Apply", a full algorithm may be applied as described in FIG. 6.

Figure 8A:
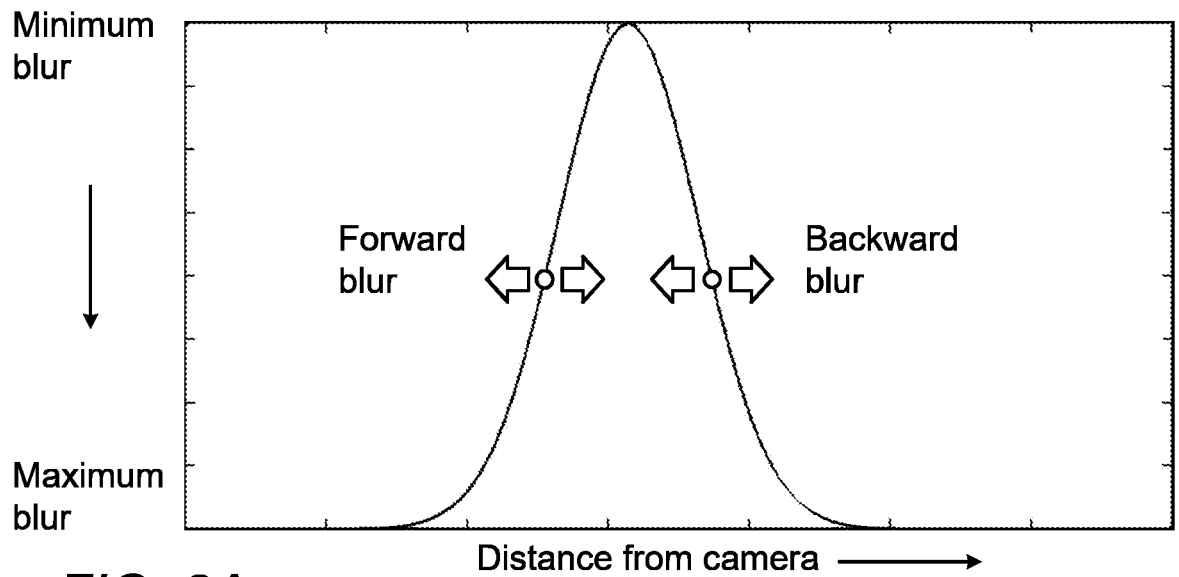
FIG. 8A shows a symmetric blur function.
Figure 8B:
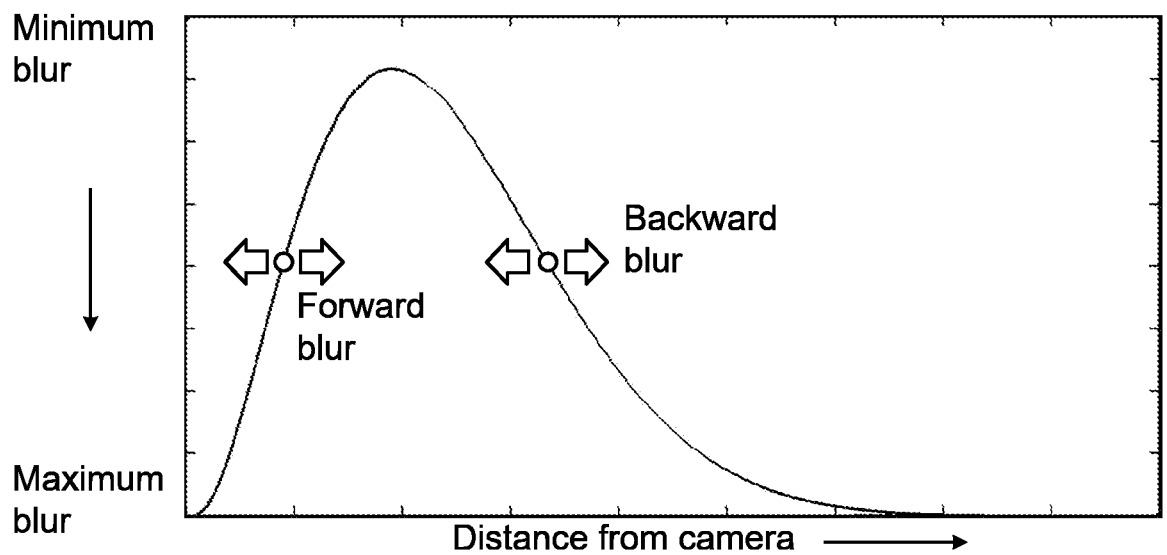
FIG. 8B shows an asymmetric blur function with functionality as described in FIG. 8A.

FIG. 8A shows a symmetric blur function. By moving the sliders (forward/backward blur) in FIG. 8A, a user may move linearly on the X axis, with blur applied to the image as indicated on the Y axis. FIG. 8B shows an asymmetric blur function with functionality as described in FIG. 8A. Application of the blur function enables the user to blur differently the foreground and the background. For example, there are cases where forward blur may be unwanted at all, from an artistic point of view. Asymmetric blur enables this possibility.

In some embodiments, further image features such as e.g. artificial lightning may be provided. Artificial lightning means that the lightning scenario in the scene can be changed by a user or a program, e.g. by artificially moving a light source within a scene. For artificial lightning, the presence of a depth map may be beneficial.

Figure 9:
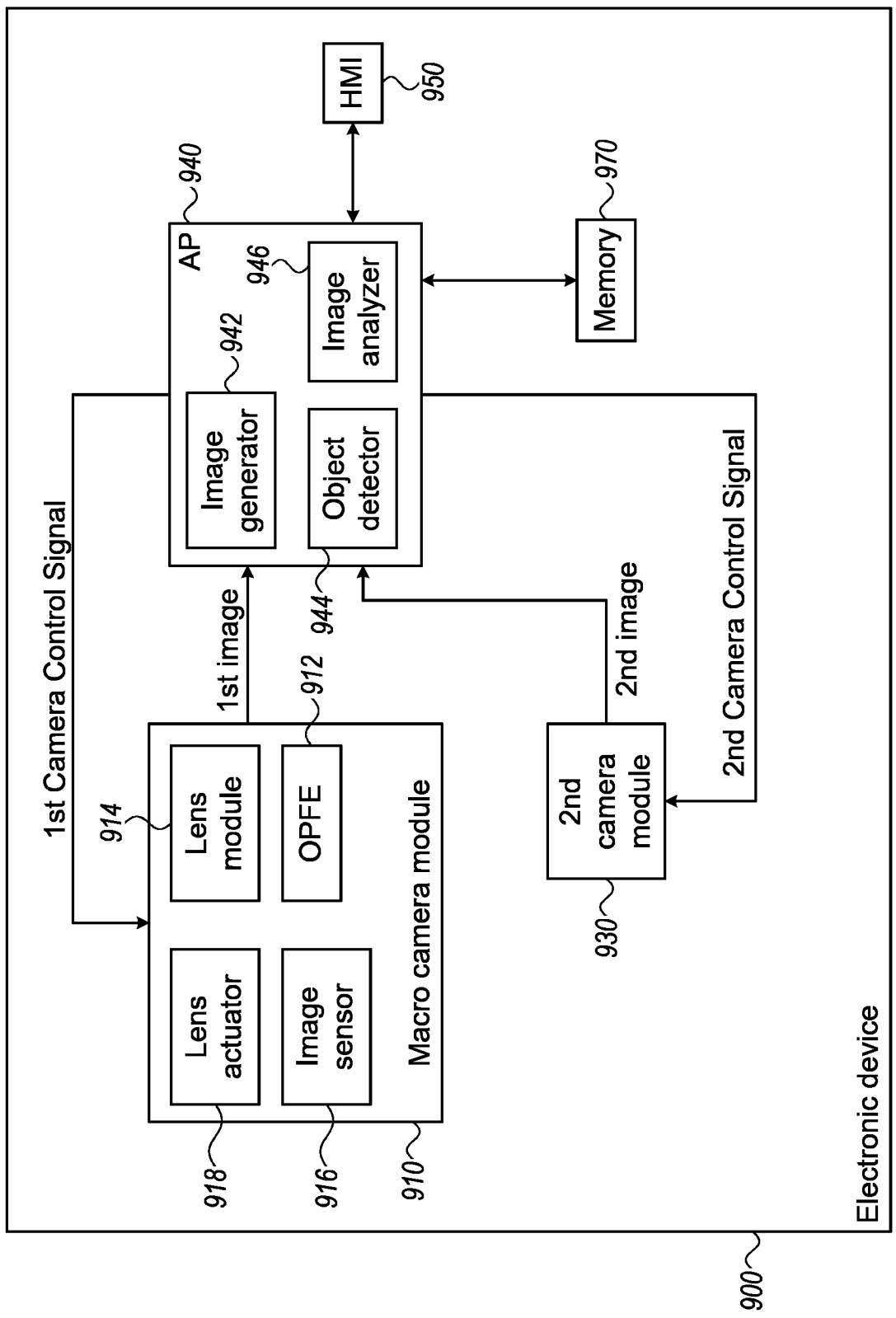
FIG. 9 shows a system for performing methods disclosed herein.

FIG. 9 shows a system 900 for performing methods as described above. System 900 comprises a first Tele camera module (or simply "Tele camera") 910. Tele camera 910 may be a Macro capable folded Tele camera, a double-folded Tele camera, a pop-out Tele camera, a scanning folded Tele camera, or an upright (non-folded) Tele camera. If camera 910 is a folded camera, it comprises an optical path folding element (OPFE) 912 for folding an optical path by 90 degrees, a lens module 914 and an image sensor 916. A lens actuator 918 performs a movement of lens module 914 to bring the lens to different lens states for focusing and optionally for OIS. System 910 may comprise an additional, second camera module 930, and an application processor (AP) 940. The second camera module 930 may be a W camera or a UW camera. In some embodiments, both a W camera and a UW camera may be included. AP 940 comprises an image generator 942 for generating images, and an image analyzer 946 for analyzing images as described above, as well as an object detector 944. A human machine interface (HMI) 950 such as a smartphone screen allows a user to transmit commands to the AP. A memory element 970 may be used to store image data. Calibration data for calibration between camera 910 and second camera module 930 may be stored in memory element 970 and/or in additional memory elements (not shown). The additional memory elements may be integrated in the camera 910 and/or in the second camera module 930. The additional memory elements may be EEPROMs (electrically erasable programmable read-only memory). Memory element 970 may e.g. be a NVM (non-volatile memory).

Figure 10:
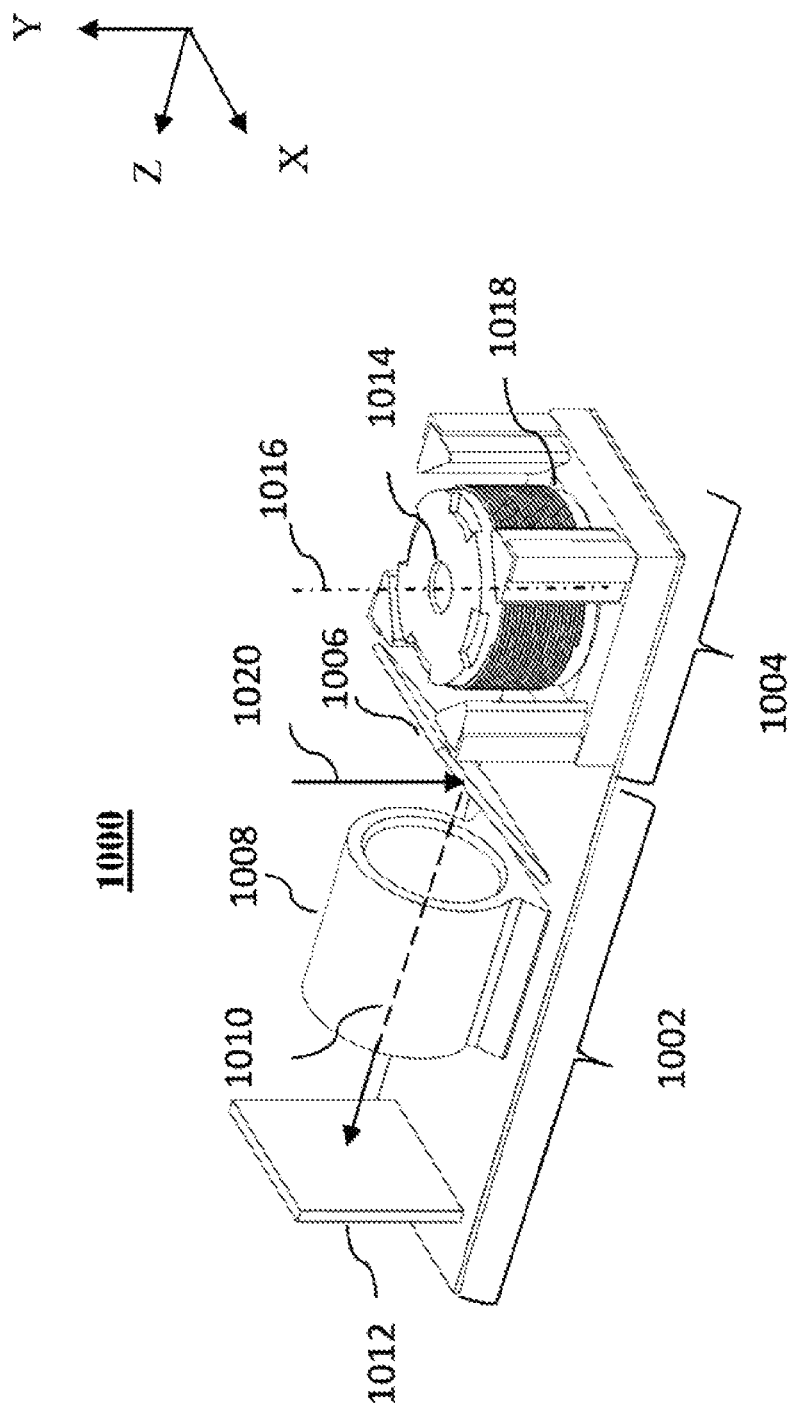
FIG. 10 shows an exemplary dual-camera.

FIG. 10 illustrates a dual-camera (which may be part of a multi-camera with more than two cameras) known in the art and numbered 1000, see e.g. co-owned international patent application PCT/IB2015/056004. Dual-camera 1000 comprises a folded Tele camera 1002 and a Wide camera 1004. Tele camera 1002 comprises an OPFE 1006, a lens 1008 that may include a plurality of lens elements (not visible in this representation, but visible e.g. in FIG. 1C-H) with an optical axis 1010 and an image sensor 1012. Wide camera 1004 comprises a lens 1014 with an optical axis 1016 and an image sensor 1018. OPFE 1006 folds the optical path from a first optical path 1020 which is substantially parallel to optical axis 1016 to a second optical path which is substantially parallel optical axis 1010.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

Furthermore, for the sake of clarity the term "substantially" is used herein to imply the possibility of variations in values within an acceptable range. According to one example, the term "substantially" used herein should be interpreted to imply possible variation of up to 5% over or under any specified value. According to another example, the term "substantially" used herein should be interpreted to imply possible variation of up to 2.5% over or under any specified value. According to a further example, the term "substantially" used herein should be interpreted to imply possible variation of up to 1% over or under any specified value.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A system, comprising:
a Wide camera for providing at least one Wide image;
a Tele camera comprising a Tele lens module;
a lens actuator for moving the Tele lens module for focusing to any distance or set of distances between 3.0 cm and 35 cm with an object-to-image magnification between 1:5 and 25:1; and
an application processor (AP) configured to analyse image data from the Wide camera to automatically select an object and to define a capture strategy for capturing the object with the Tele camera a sequence of Macro images with a focus plane shifted from one captured Macro image to another captured Macro image, and to generate a new Macro image from this sequence, wherein the system is included in a mobile electronic device.

2. The system of claim 1, wherein the focus plane and a depth of field of the new Macro image can be controlled continuously post-capture.

3. The system of claim 1, wherein the focusing is to object-lens distances of 3.0-25 cm.

4. The system of claim 1, wherein the focusing is to object-lens distances of 3.0-15 cm.

5. The system of claim 1, wherein the Tele camera is a folded Tele camera comprising an optical path folding element.

6. The system of claim 1, wherein the Tele camera is a double-folded Tele camera comprising two optical path folding elements.

7. The system of claim 1, wherein the Tele camera is a pop-out Tele camera comprising a pop-out lens.

8. The system of claim 1, wherein the AP is configured to calculate a depth map from Wide image data or Wide phase detection auto-focus (PDAF) image data and to use the depth map to define the capture strategy for capturing with the Tele camera a sequence of Macro images or to generate the new Macro image.

9. The system of claim 1, wherein the Tele camera has an EFL of EFL=10-20 mm.

10. The system of claim 1, wherein the Tele camera has an EFL of EFL=20-40 mm.

11. The system of claim 1, wherein instead of a Wide camera an Ultra-Wide camera is used for providing at least one Ultra-Wide image.

12. The system of claim 1, wherein the Tele camera can be switched between two or more discrete zoom states.

13. The system of claim 12, wherein the AP is configured to analyse image data from the Wide camera to switch the Tele camera to a specific zoom state for capturing Macro images which have a specific magnification and a specific field of view.

14. The system of claim 12, wherein a zoom factor of a maximum zoom state is 2×larger than a zoom factor of a minimum zoom state.

15. The system of claim 13, wherein the analysis of image data from the Wide camera includes use of a saliency map.

16. The system of claim 1, wherein the generation of the new Macro image uses a Wide image as a reference image.

17. The system of claim 1, wherein the Tele capture strategy is adjusted during capture of the sequence of Macro images based on information from captured Macro images.

18. The system of claim 1, wherein the mobile electronic device is a smartphone.

19. The system of claim 1, wherein the mobile electronic device is a tablet.

20. A method, comprising: in a mobile electronic device comprising a Wide camera and a Tele camera:
using the Wide camera to provide at least one Wide image;
focusing the Tele camera to any distance or set of distances between 3.0 cm and 35 cm with an object-to-image magnification between 1:5 and 25:1;
based on image data from the Wide camera, automatically selecting an object and defining a capture strategy for capturing the object with the Tele camera a sequence of Macro images with a focus plane shifted from one captured Macro image to another captured Macro image; and
generating a new Macro image from the sequence of Macro images.

* * * * *